United States Patent
Hanahara et al.

(10) Patent No.: US 8,442,856 B2
(45) Date of Patent: May 14, 2013

(54) TRANSLATION SUPPORT APPARATUS AND COMPUTER-READABLE STORAGE MEDIUM

(75) Inventors: Kei Hanahara, Kanagawa (JP); Naohide Kaiya, Kanagawa (JP); Hiromasa Suzuki, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 155 days.

(21) Appl. No.: 13/033,734

(22) Filed: Feb. 24, 2011

(65) Prior Publication Data
US 2011/0218939 A1    Sep. 8, 2011

(30) Foreign Application Priority Data

Mar. 3, 2010  (JP) .................. 2010-046638
Mar. 3, 2010  (JP) .................. 2010-046644

(51) Int. Cl.
G06Q 10/00 (2012.01)
G06Q 30/00 (2012.01)

(52) U.S. Cl.
USPC ........................................ 705/7.35

(58) Field of Classification Search ................. 705/7.35
See application file for complete search history.

(56) References Cited

U.S. PATENT DOCUMENTS

| | | | |
|---|---|---|---|
| 2006/0242073 A1 | 10/2006 | Padawer et al. | |
| 2006/0277332 A1 | 12/2006 | Yamashina | |
| 2007/0050182 A1 | 3/2007 | Sneddon et al. | |
| 2009/0241115 A1* | 9/2009 | Raffo et al. | 718/100 |

FOREIGN PATENT DOCUMENTS

| | | |
|---|---|---|
| JP | 2002-073786 | 3/2002 |
| JP | 2004-213147 A | 7/2004 |
| JP | 2004-318453 | 11/2004 |
| JP | 2004-534326 | 11/2004 |
| JP | 3771159 | 4/2006 |
| JP | 4014563 | 11/2007 |
| JP | 4049299 | 2/2008 |
| JP | 2009-506428 A | 2/2009 |
| WO | WO 03/005258 | 1/2003 |
| WO | WO2005/065033 | 7/2005 |

OTHER PUBLICATIONS

No Author Name Supplied in Source Data: "Proofreading assistance for translation", ip.com Journal, ip.com Inc., West Henrietta, NY, US, Mar. 16, 2004.
Extended European search report dated Jun. 7, 2011.
Japanese Office Action dated Aug. 21, 2012.
Japanese Office Action dated Nov. 27, 2012.

* cited by examiner

Primary Examiner — John Hayes
Assistant Examiner — Allen J Jung
(74) Attorney, Agent, or Firm — IPUSA, PLLC

(57) ABSTRACT

A translation support apparatus manages a series of processes related to a translation work of an original text and a proofreading work of a translation. A payable translation fee may be calculated by subtracting a reduction fee calculated based on a proofread record and a reduction fee table from a prescribed translation fee calculated based on the translation and a prescribed translation fee table.

4 Claims, 16 Drawing Sheets

FIG. 4

PROOFREADING SCREEN

| | | |
|---|---|---|
| | `<chargraphic fileref="../../flips-oi/common-graphic/char_graphic/char_ric00.gif" alt="" />See Copy and Document Server Reference for <ulink url="../../copy/int/duplex.htm">details</ulink>` (SentenceID:00000442) Printing multi-page documents and received faxes on a single sheet (`<nobracket>`Combine`</nobracket>`) (Copier/Fax) `<chargraphic fileref="../../flips-oi/common-graphic/char_graphic/char_ric00.gif" alt="" />See Copy and Document Server Reference for <ulink url="../../copy/int/combine.htm">details</ulink>` (SentenceID:00000443) | `<chargraphic fileref="../../flips-oi/common-graphic/char_graphic/char_ric00.gif" alt="" />Siehe Kopierer-und Dokument Server-Handbuch fur <ulink url="../../copy/int/duplex.htm">Details</ulink>` Printing multi-page documents and received faxes on a single sheet (`<nobracket>`Combine`</nobracket>`) (Copier/Fax) `<chargraphic fileref="../../flips-oi/common-graphic/char_graphic/char_ric00.gif" alt="" />Siehe Kopierer-und Dokument Server-Handbuch fur <ulink url="../../copy/int/combine.htm">Details</ulink>` |

Edited translation. * indicates essential item.

| Sentence ID | 443 | Final updater | System | Final update date & time | 2010-02-16 13:54:24.518 |
|---|---|---|---|---|---|

| | |
|---|---|
| 401 TRANSLATION SOURCE / COPY ENGLISH TEXT | Printing multi-page documents and received faxes on a single sheet (`<nobracket>`Combine`</nobracket>`)(Copier/Fax)) |
| | English text of translation source will be displayed. Not possible to newly write. |
| 402 TRANSLATION SOURCE MATCHING SENTENCE | Printing multi-page documents and received faxes on a single sheet (Combine (Copier/Fax)) |
| 403 TRANSLATION DESTINATION MATCHING SENTENCE / COPY MATCHING SENTENCE 91% | Mehrseitige Dokumente und eingegangene Faxsendungen auf einem Blatt ausdrucken (Kombinieren (Kopierer/Fax)) |
| | Sentence with highest translation hit rate will be displayed. Not possible to newly write. |
| 404 TRANSLATED SENTENCE SET | Mehrseitige Dokumente und eingegangene Faxsendungen auf einem Blatt ausdrucken (((`<nobracket>`Kombinieren(`</nobracket>`) (Kopierer/Fax) |
| 405 PROOFREADING TYPE | ○ No error   ● Error exists   Proofreading type |

FIG.5

INPUT SCREEN

INPUT PROOFREADING TYPE

- This sentence is 10 words in English.
- Plural proofreading types may be input.
- Amount payable to translator is calculated based on number of English words, but please input the number of words in other language.

| | | | |
|---|---|---|---|
| Translation error | [___] Words | Syntax error | [___] Words |
| Spelling error | [___] Words | Punctuation error | [___] Words |
| Capitalization error | [___] Words | Bad Style | [___] Words |
| Inconsistency | [___] Words | Technical Translation | [___] Words |
| No translation | [___] Words | Other | [___] Words |

[ SET ]   [ CANCEL ]

FIG.6

| Translation Hit Rate | number of words corrected during proofreading | | | | | | | |
|---|---|---|---|---|---|---|---|---|
| | Translation error | | Syntax error | | Spelling error | | Punctuation error | |
| | total | ... | total | ... | total | ... | total | ... |
| 100% | 0 | | 0 | | 0 | | 0 | |
| 99-95% | 0 | | 0 | | 0 | | 0 | |
| 94-85% | 0 | | 0 | | 0 | | 1 | |
| 84-75% | 0 | | 0 | | 0 | | 0 | |
| 74-50% | 0 | | 0 | | 0 | | 0 | |
| No Match | 46 | | 0 | | 2 | | 12 | |

FIG.7

| 100% | € 0.00 |
| --- | --- |
| 99–95% | € 0.08 |
| 94–85% | € 0.08 |
| 84–75% | € 0.08 |
| 74–50% | € 0.16 |
| No Match | € 0.16 |

FIG.8

| PROOFREADING TYPE | REDUCTION RATE |
|---|---:|
| TRANSLATION ERROR | 100.00% |
| SYNTAX ERROR | 75.00% |
| SPELLING ERROR | 41.67% |
| PUNCTUATION ERROR | 33.33% |
| CAPITALIZATION ERROR | 33.33% |
| BAD STYLE (OR STYLE ERROR) | 25.00% |
| INCONSISTENCY | 50.00% |
| TECHNICAL TRANSLATION ERROR | 41.67% |
| OTHER | 16.67% |
| NO TRANSLATION | 100.00% |
| NO ERROR | 0.00% |

FIG.9

| Language | GERMAN | | | | | | | | |
|---|---|---|---|---|---|---|---|---|---|
| Translation Company | PROD | | | | | | | | | translation fee (unit:word/graphic)

| Translation Hit Rate | Total | number of words corrected during proofreading | | | | | | | | number of words to be paid | unit price | translation fee |
|---|---|---|---|---|---|---|---|---|---|---|---|---|
| | | Translation error | | Syntax error | | Spelling error | | Punctuation error | | | | |
| | | total | deduction | total | deduction | total | deduction | total | deduction | | | |
| 100% | 13538 | 0 | 0.00 | 0 | 0.00 | 0 | 0.00 | 0 | 0.00 | 13583 | € 0.00 | € 0.00 |
| 99-95% | 205 | 0 | 0.00 | 0 | 0.00 | 0 | 0.00 | 0 | 0.00 | 205 | € 0.08 | € 16.39 |
| 94-85% | 90 | 0 | 0.00 | 0 | 0.00 | 0 | 0.00 | 1 | 0.33 | 90 | € 0.08 | € 7.17 |
| 84-75% | 0 | 0 | 0.00 | 0 | 0.00 | 0 | 0.00 | 0 | 0.00 | 0 | € 0.08 | € 0.00 |
| 74-50% | 0 | | | | | | | | | 0 | € 0.16 | € 0.00 |
| No Match | 1160 | 46 | 46.00 | 0 | 0.00 | 2 | 0.83 | 12 | 4.00 | 1105 | € 0.16 | € 176.87 |
| | | | | | | | | | | total | | € 200.43 |

901 / 902 / 903 AMOUNT OF REDUCTION / 904 / 905

FIG.13

| KINDS (FIELDS) OF MANUAL IN ORIGINAL TEXT | SEARCH DESTINATION TRANSLATION MEMORY |
|---|---|
| UM | UM<br>U-FAQ |
| U-FAQ | U-FAQ<br>UM |
| SM | SM<br>S-FAQ |
| S-FAQ | S-FAQ<br>SM |

FIG.14

| TRANSLATION MEMORY | TRANSLATION SOURCE LANGUAGE (ENGLISH)→MULTIPLE LANGUAGES | | | | | | | | | |
|---|---|---|---|---|---|---|---|---|---|---|
| | GERMAN | | FRENCH | | ITALIAN | | SPANISH | |
| | R | W | R | W | R | W | R | W |
| UM | ○ | ○ | ○ | ○ | ○ | ○ | ○ | ○ |
| U-FAQ | ○ | ○ | ○ | ○ | ○ | ○ | ○ | ○ |
| SM | ○ | ○ | ○ | ○ | ○ | ○ | ○ | ○ |
| S-FAQ | ○ | ○ | ○ | ○ | ○ | ○ | ○ | ○ |

TRANSLATION SUPPORT APPARATUS AND COMPUTER-READABLE STORAGE MEDIUM

CROSS-REFERENCE TO RELATED APPLICATIONS

This application claims the benefit of Japanese Patent Applications No. 2010-046638 filed on Mar. 3, 2010 and No. 2010-046644 filed on Mar. 3, 2010, in the Japanese Patent Office, the disclosures of which are hereby incorporated by reference.

BACKGROUND OF THE INVENTION

1. Field of the Invention

The present invention relates to translation support apparatuses and computer-readable storage media. The computer-readable storage medium may store a program which, when executed by a computer, causes the computer to perform a translation support process.

2. Description of the Related Art

A product, such as an OA (Office Automation) equipment, may be manufactured on a precondition that the product will be exported to a foreign country. In this case, a manual for the product, such as an operation manual and a maintenance or service manual, needs to be translated into a foreign language, such as an official language used in the country to which the product is exported. Hence, a translation work is carried out to translate an original manual, which may be in English, into another foreign language.

Conventionally, a manufacturer may place an order for the translation work to a translation company using a translation support system on the Web. The translation support system may centrally manage a series of processes related to the translation work of the manual, that may include creating the original-language text, placing the order for the translation, performing the translation, proofreading or correcting the translation, delivering the translation, bookbinding, and issuing a debit note. Examples of this translation support system are proposed in Japanese Patents No. 3771159 and No. 4049299.

The processes related to the translation work of the manual when utilizing the above translation support system may include the following processes P1 through P7.

The process P1 creates the text of the original-language manual by the manufacturer. The original language may be Japanese or, may be English if the product is expected to be exported to countries using various languages, for example.

The process P1 places the order for the translation work from the manufacturer to the translation company. The manufacturer may acquire estimates for the translation work through the translation support system in order to select the translation company. In this case, the manufacturer places the order for the translation work to the selected translation company.

The process P3 performs the translation by the translation company. The translation company who receives the original-language manual through the translation support system, segments the manual into sections if necessary, and assigns the translation of the sections to individual translators. Each translator translates the section of the manual assigned to the translator. The translator may access the translation support system via a Web browser in order to efficiently perform the translation work on a Web screen by utilizing a translation memory provided by the translation support system. When the translation work of each translator is completed, the translated sections are submitted to the manufacturer through the translation support system.

The process P4 proofreads or corrects the translations by the manufacturer. A proofreader at the manufacturer may proofread the translation for translation errors, correct the translation errors if any, and send the corrected translation to the translation company. Alternatively, the proofreader may inform the translation errors to the translation company, in order to have the translation errors corrected at the translation company and have the corrected translation resubmitted to the manufacturer.

The process P5 formally delivers the translation (or corrected translation) of the manual from the translation company to the manufacturer.

The process P6 performs a DTP (Desk-Top Publishing) at the manufacturer or, at the translation company, and edits the final translated manual using DTP software. The edited translated manual may be output in the form of a PDF (Portable Document Format) file.

The process P7 pays a translation fee for the translation work from the manufacturer to the translation company. The manufacturer may output a payment report based on translation results utilizing the translation support system, and pay the translation fees to the translation company based on the payment report. Generally, the translation fee is in most cases calculated by multiplying a price per word by a total number of translated words.

According to the translation support system described above, the series of processes P1 through P7 may be centrally managed on the Web. In addition, the translation support system may provide various support tools described hereunder, in order to support efficient translation work and proofreading or correcting work.

For example, the translator may efficiently perform the translation work using a translation tool implemented with the so-called translation memory. The translation memory is software that supports the translation, and forms a DB (Data-Base) that successively accumulates the translated texts (or translated data) that have been translated by the translators in the past by relating the translated texts to the original texts that were translation targets. When the translation tool implemented with the translation memory is used and a text identical to or similar to the original text has been translated in the past, the translation may be searched and extracted from the translation memory in order to automatically convert the original text using the translation. The translator using the translation tool may newly translate only portions of the translation not automatically converted based on the contents of the translation memory, so that the translation efficiency is improved.

In addition, when performing the proofreading work on the translation using the translation tool, for example, the proofreading efficiency may be improved by confirming the need for correction only for the portions newly translated by the translator, that is, portions other than the portions automatically converted based on the contents of the translation memory. Hence, when each translator proofreads or corrects the translation that is made using the translation tool implemented with the translation memory, each translator may use a proofreading tool that enables distinguishable editing of the portions acquired from the translation memory and the portions newly translated by the translator. The proofreader at the manufacturer may use such a proofreading tool in order to confirm only the portions newly translated by the translator, in order to improve the efficiency of the proofreading work.

When performing the process P4 described above, the proofreader at the manufacturer may confirm, on the Web screen of the translation support system, whether a translation error or the like exists in the translation translated by the translator and then, correct the translation error if any. In the series of processes related to the translation work of the manual, the process P4, which checks for translation errors in the translation translated by the translation company and corrects the translation errors, may be important from the point of view of obtaining a high translation quality.

However, the items to be actually confirmed by the proofreader include various items, such as translation errors, syntax errors, and spelling errors. Even if the portions to be confirmed by the proofreader are the portions newly translated by the translator who uses the translation tool, a troublesome operation may be required to confirm and correct the errors, particularly if the number of errors is relatively large or, the errors are scattered. Hence, the operation to confirm and correct the errors may be a burden on the proofreader at the manufacturer.

On the other hand, in the conventional translation support system, the translation fee is calculated in the same manner regardless of whether the translation includes a large number of errors. For this reason, from the point of view of the translation quality and the load caused by the operation to confirm and correct the errors, a sense of unfairness may exist for the translation fee calculated in the process P7 described above.

SUMMARY OF THE INVENTION

Accordingly, it is a general object in one embodiment of the present invention to provide a novel and useful translation support apparatus and computer-readable storage medium, in which the problem described above may be suppressed.

Another and more specific object in one embodiment of the present invention is to provide a translation support apparatus and a computer-readable storage medium, which may calculate a translation fee to be paid for a translation depending on a translation quality, that is, a number of errors found in the translation at the time of proofreading.

Another and more specific object in another embodiment of the present invention is to provide a translation support apparatus and a computer-readable storage medium, which may improve a translation hit rate of the translation retrieved from a translation memory.

According to one aspect of the present invention, there is provided a translation support apparatus connectable to a translator terminal and a proofreader terminal via a network, and configured to manage a series of processes related to a translation work of an original text that is a translation target into a translation in a predetermined language and a proofreading work of the translation, the translation support apparatus including a storage unit configured to store translations from the translator terminal, a prescribed translation fee table of prescribed translation fees calculated depending on the translations, and a reduction fee table of reduction fees to be deducted depending on proofread contents of the translation; a screen generating unit configured to generate a proofreading screen including the translation to be proofread; a communication unit configured to send the proofreading screen to the proofreader terminal, and to receive a proofread translation and a proofread record recorded with the proofread contents of a proofread translation from the proofreader terminal via the proofreading screen; and a calculating unit configured to calculate a payable translation fee by subtracting a reduction fee calculated based on the proofread record and the reduction fee table from a prescribed translation fee calculated based on the translation from the translation terminal and the prescribed translation fee table.

According to one aspect of the present invention, there is provided a non-transitory computer-readable storage medium which stores a program which, when executed by a computer that is connectable to a translator terminal and a proofreader terminal via a network, causes the computer to perform a process related to a translation work of an original text that is a translation target into a translation in a predetermined language and a proofreading work of the translation, the process including a storage procedure causing the computer to store, in a storage unit, translations from the translator terminal, a prescribed translation fee table of prescribed translation fees calculated depending on the translations, and a reduction fee table of reduction fees to be deducted depending on proofread contents of the translation; a screen generating procedure causing the computer to generate a proofreading screen including the translation to be proofread; a communication procedure causing the computer to send the proofreading screen to the proofreader terminal, and to receive a proofread translation and a proofread record recorded with the proofread contents of a proofread translation from the proofreader terminal via the proofreading screen; and a calculating procedure causing the computer to calculate a payable translation fee by subtracting a reduction fee calculated based on the proofread record and the reduction fee table from a prescribed translation fee calculated based on the translation from the translation terminal and the prescribed translation fee table.

According to one aspect of the present invention, there is provided a translation support apparatus comprising a translation memory group including a plurality of translation memories classified for each kind of document and configured to store translations in a related manner to corresponding texts; a search unit configured to search within the translation memory group to find a text matching an original text that is a translation target; a storage unit configured to store search destination translation memory information prescribing the translation memories to be searched within the translation memory group depending on the kind of document of the original text; and a conversion generating unit configured to acquire a translation stored in the translation memory group in a related manner to the text searched by the search unit, and to generate a reused translation by converting the original text into the translation, wherein the search unit searches two or more translation memories within the translation memory group based on the search destination translation memory information.

According to one aspect of the present invention, there is provided a non-transitory computer-readable storage medium which stores a program which, when executed by a computer, causes the computer to perform a translation support process using a translation memory group including a plurality of translation memories classified for each kind of document and configured to store translations in a related manner to corresponding texts, the translation support process including a search procedure causing the computer to search within the translation memory group to find a text matching an original text that is a translation target; a storage procedure causing the computer to store, in a storage unit, search destination translation memory information prescribing the translation memories to be searched within the translation memory group depending on the kind of document of the original text; and a conversion generating procedure causing the computer to acquire a translation stored in the translation memory group in a related manner to the text searched by the search procedure, and to generate a reused translation by converting the original text into the translation, wherein the search procedure causes the computer to search two or more translation memories within the translation memory group based on the search destination translation memory information.

Other objects and further features of the present invention will be apparent from the following detailed description when read in conjunction with the accompanying drawings.

BRIEF DESCRIPTION OF THE DRAWINGS

FIG. 4 is a diagram illustrating an example of a proofreading screen;

FIG. 5 is a diagram illustrating an example of an input screen for a number of corrections for each type of proofreading and each proofread location;

FIG. 6 is a diagram illustrating an example of a proofread record;

FIG. 7 is a diagram illustrating an example of a prescribed translation fee table;

FIG. 8 is a diagram illustrating an example of a reduction fee table;

FIG. 9 is a diagram illustrating an example of a payment report;

FIG. 13 is a diagram illustrating an example of search destination translation memory information;

FIG. 14 is a diagram illustrating an example of a management table for managing translation memory use status;

DESCRIPTION OF THE PREFERRED EMBODIMENTS

Figure 1:
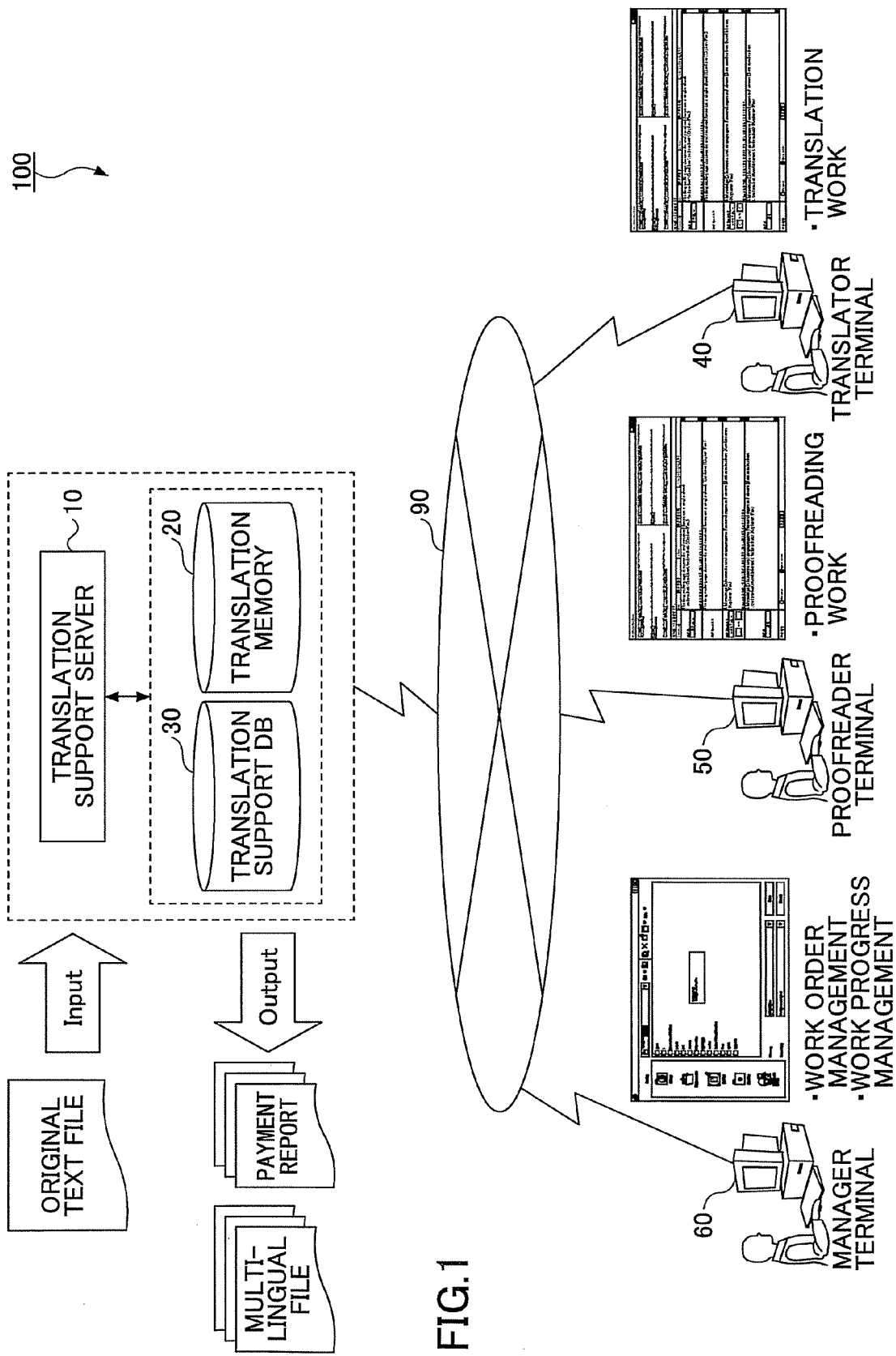
FIG. 1 is a diagram illustrating a structure of an example of a translation support system in a first embodiment of the present invention.

A description will be given of a translation support apparatus and a computer-readable storage medium in embodiments of the present invention, by referring to the drawings. For example, the computer-readable storage medium may be formed by a non-transitory storage medium or a tangible storage medium.

First Embodiment

System Structure

First, a description will be given of a system structure in a first embodiment of the present invention, by referring to FIG. 1. FIG. 1 is a diagram illustrating a structure of an example of a translation support system in the first embodiment of the present invention. As illustrated in FIG. 1, a translation support system 100 includes a translation support server 10, a translation memory 20, a translation support DB (Data-Base) 30, at least one translator terminal 40, at least one proofreader terminal 50, and at least one manager terminal 60 which are mutually connected via a network 90. For the sake of convenience, only one translator terminal 40, one proofreader terminal 50, and one manager terminal 60 are illustrated in FIG. 1.

The translation support server 10 forms an example of a translation support apparatus, and provides translation support with respect to the translator terminal 40, the proofreader terminal 50, and the manager terminal 60. When a manufacturer places an order for a translation work of a manual to a translation company (or firm), the manager terminal 60 may centrally manage on the Web a series of processes related to the translation work of the manual, that may include creating an original-language manual, placing the order for the translation, performing the translation, proofreading or correcting the translation, delivering the translation, bookbinding, and issuing a debit note. The translation support server 10 may provide a translation function utilizing the translation memory 20, with respect to the translator terminal 40 that may be operated by a translator. The translation support server 10 may also provide a translation proofreading or correcting function with respect to the proofreader terminal 50 that may be operated by a proofreader. In this example, the translation support server 10 employs the Web as an interface with respect to each of the terminals 40, 50, and 60, and thus, the translation support server 10 also functions as a Web server.

The translation memory 20 is software that supports the translation, and forms a DB (Data-Base) that successively stores the translated texts (or translated data) that have been translated by translators in the past by relating the translated texts to the original texts that were translation targets. The translation support server 10 performs a matching (or search) of the original text that is to be newly translated with respect to the translation results accumulated in the translation memory 20, and if a matching original text is included in the translation results, extracts the translation (or translated text) that is related to the matching original text and accumulated in the translation memory 20. Hence, if a text identical to or similar to the original text has been translated in the past, the translation (or translated text) may be searched and extracted from the translation memory 20 in order to automatically convert the original text using the translation. The translator at the translator terminal 40 may newly translate only portions of the translation not automatically converted based on the contents of the translation memory 20, so that the translation efficiency is improved.

The translation support DB 30 forms an example of a storage unit (or storage means) that stores data of the original text (or original text file) that is to be newly translated, data of translated text (or multi-lingual file) translated by the translator and before or after the proofreading, data for managing a progress status of the translation, other various data used for supporting the translation and calculating a translation fee, and the like. The various data used for calculating the translation fee may include a prescribed translation fee table, a reduction fee table, a proofread (or correction) record or log, a payment report, and the like. As illustrated in FIG. 1, the data of the original text (or original text file) that is to be newly translated is prestored in the translation support DB 30 by the manufacturer when the manufacturer places the order for the translation work of the manual. The translation (or translated text) that is translated and corrected, that forms a final result, may be stored in the translation support DB 30 as the multilingual file. The translation (or translated text) is related to information, such as the original text corresponding to the translation, the newly translated portions, and the portions acquired from the translation memory 20, and stored in the translation support DB 30 in a form of a relational DB.

The translator terminal 40 may be formed by a general-purpose computer, such as a PC (Personal Computer) including a processor, a storage unit, an input device (for example, a keyboard), and a display unit, and may be operated by the translator to perform the translation work. The translator may operate the translator terminal 40 to make a Web access to the translation support server 10 and to display a translation screen (or page) for performing the translation work on the display unit by a Web browser. The original text that is to be newly translated by the translator is displayed on the translation screen, and a matching is performed between the original text that is to be newly translated (or the input original text file) and texts of the translation results accumulated in the translation memory 20, using the translation support function of the translation support server 10. If a text matching the original text that is to be newly translated is found in the translation memory 20, the related translation (or translated text) is extracted and displayed on the display unit. In this case, the translation screen displays the translation of the automatically converted portion of the text extracted from the translation memory 20, and the portion of the text for which the translation could not be found in the translation memory 20 and for which the translation is newly required. The translator at the translator terminal 40 may perform the translation work on only the portion of the text for which the translation is newly required, in order to improve the translation efficiency.

The proofreader terminal 50 may be formed by a general-purpose computer, such as a PC (Personal Computer) including a processor, a storage unit, an input device (for example, a keyboard), and a display unit, and may be operated by the proofreader to perform the proofreading or correcting work on the translation. The proofreader may operate the proofreader terminal 50 to make a Web access to the translation support server 10 and to display a proofreading screen (or page) for performing the proofreading or correcting work on the display unit by a Web browser. The proofreading screen displays the translation (or translated text) or the translation result that is translated by the translator, and the proofreader may confirm the translation and perform the proofreading or correcting work on the translation on the proofreading screen. In addition, because the proofreading screen displays the translation of the automatically converted portion of the text extracted from the translation memory 20, and the portion of the text for which the translation could not be found in the translation memory 20 and for which the translation was performed by the translator, the proofreader at the proofreader terminal 50 may perform the proofreading or correcting work on only the portion of the text for which the translation was newly made by the translator, in order to improve the proofreading or correction efficiency.

The erroneous locations (or proofread location or corrected locations) or the number of errors may be recorded on the proofreading screen of this example, when the translation error is found and the proofreading or correcting work is performed. The recorded information may be reflected in the translation fee of the translation company, as will be described later.

The manager terminal 60 may be formed by a general-purpose computer, such as a PC (Personal Computer) including a processor, a storage unit, an input device (for example, a keyboard), and a display unit, and may be operated by the manager to perform the management work related to the translation work at the manufacturer. The manager may operate the manager terminal 60 to make a Web access to the translation support server 10 and to display a management screen (or page) for performing the management work on the display unit by a Web browser. The management screen may enable the manager to centrally manage on the Web the series of processes related to the translation work of the manual, that may include creating the original-language manual, placing the order for the translation, performing the translation, proofreading or correcting the translation, delivering the translation, bookbinding, and issuing the debit note.

The manager terminal 60 may output the payment report in a billing stage, and the translation fee is pay from the manufacturer to the translation company based on the translation fee in the payment report. The erroneous locations (or proofread or corrected locations) or the number of errors included in the recorded information and found in the proofreading or correcting stage may be reflected in the payment of the translation fee, as will be described later. For example, the translation fee paid from the manufacturer to the translation company may be reduced depending on the errors found or corrected in the proofreading or correcting stage.

The network 90 may be formed by any suitable communications network, including the Internet, that enables mutual communication among the translation support server 10 and each of the terminals 40, 50, and 60.

(Hardware Structure)

Figure 2:
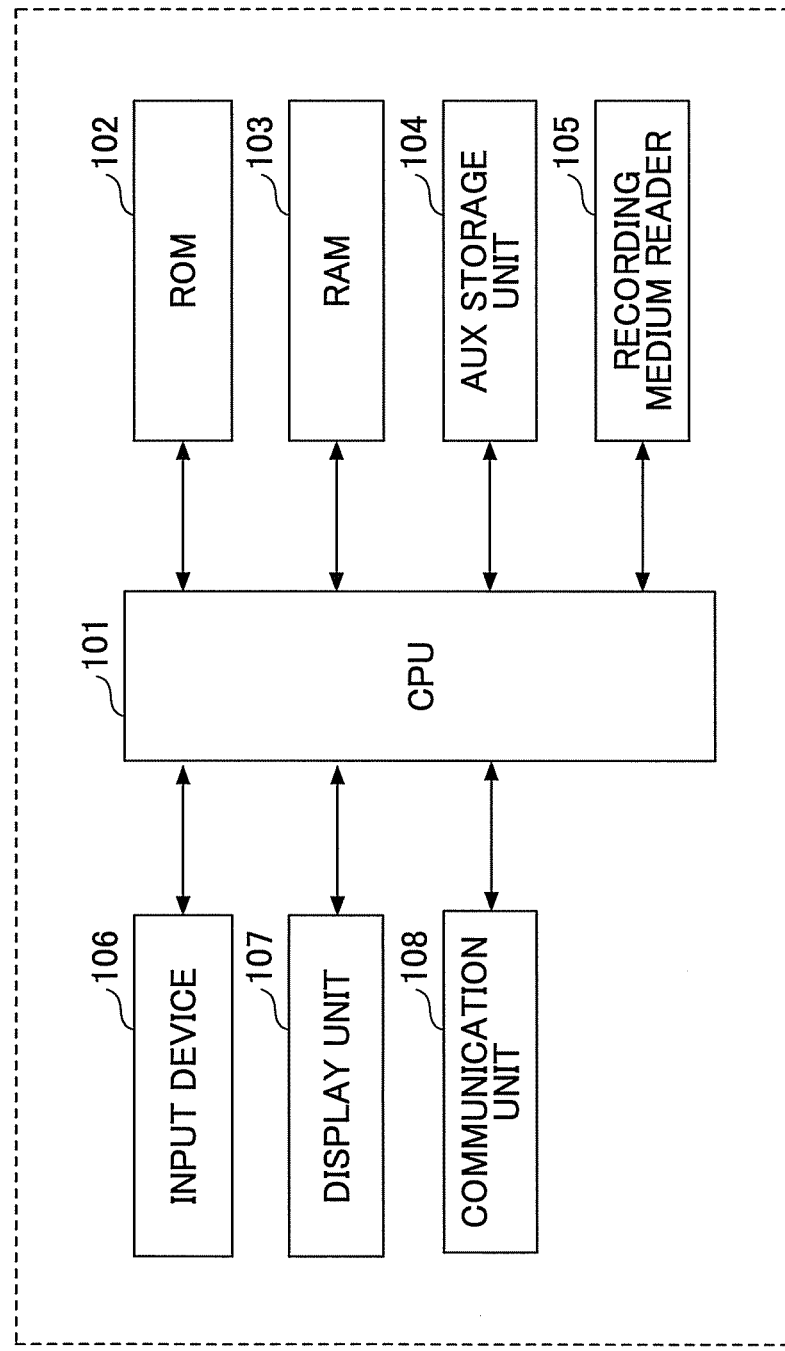
FIG. 2 is a block diagram illustrating a hardware structure of an example of a translation support server in the first embodiment of the present invention.

Next, a description will be given of a hardware structure of the translation support server 10, by referring to FIG. 2. FIG. 2 is a block diagram illustrating the hardware structure of an example of the translation support server in the first embodiment of the present invention. As illustrated in FIG. 2, the translation support server 10 includes a CPU 101, a ROM (Read Only Memory) 102, a RAM (Random Access Memory) 103, an auxiliary storage unit 104, a recording medium reader 105, an input device 106, a display unit 107, and a communication unit 108.

The CPU 101 may include a microprocessor and its peripheral circuits, and control the entire operation of the translation support server 10. The ROM 102 may store control programs (or software parts) to be executed by the CPU 101, and various data. The RAM 103 may provide a work area (or work region) for various operations that are carried out when the CPU 101 executes the control programs stored in the ROM 102, and store various data.

The auxiliary storage unit 104 may store various information including a general-purpose OS (Operating System) and translation support tools or programs. The auxiliary storage unit 104 may be formed by a non-volatile storage unit such as a HDD (Hard Disk Drive). The translation memory 20 and the translation support DB 30 may be formed using the auxiliary storage unit 104 or, by using an external auxiliary storage unit coupled externally to the translation support server 10.

The input device 106 may be used by an operator (or user) to input various information and instructions. For example, the input device 106 may be formed by a keyboard, a mouse or the like. The display unit 107 may be used to display various data and screens. The display unit 107 may be formed by a LCD (Liquid Crystal Display), a CRT (Cathode Ray Tube), a plasma display or the like. The input device 106 and the display unit 107 may be integrally formed by a touch-screen panel.

The communication unit 108 enables a communication between the translation support server 10 and other equipments via the network 90. The communication unit 108 may support various types of communication depending on the network structure, such as cable networks and wireless networks.

(Functions)

Next, a description will be given of the functional structures of the translation support server 10, the translator terminal 40, and the proofreader terminal 50, by referring to FIG. 3.

Figure 3:
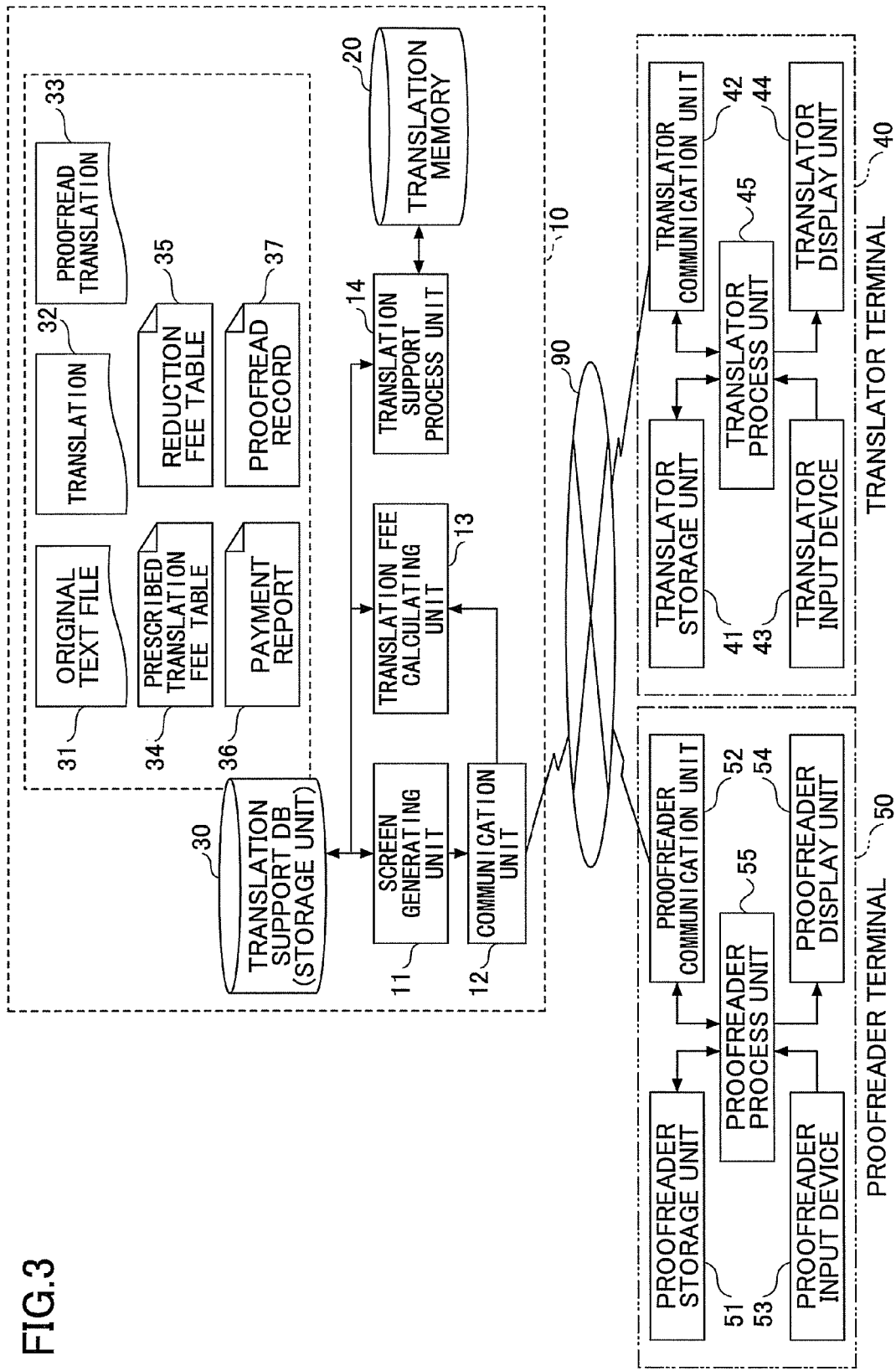
FIG. 3 is a block diagram illustrating a functional structure of an example of the translation support server and terminals in the first embodiment of the present invention.

FIG. 3 is a block diagram illustrating the functional structure of an example of the translation support server 10 and the terminals 40 and 50 in the first embodiment of the present invention. As illustrated in FIG. 3, the translation support server 10 includes a storage unit (or part) 30, a screen generating unit (or part) 11, a communication unit (part) 12, a translation fee calculating unit (part) 13, and a translation support process unit (part) 14, whose functions may be realized by the CPU forming the translation support server 10.

The storage unit 30 may store an original text file 31 of the original text that is to be newly translated, a translation (or translated text) 32 that has been translated by the translator, a proofread translation 33 that has been proofread or corrected by the proofreader, a prescribed translation fee table 34, a reduction fee table 35, a payment report 36, a proofread record 37, and other information and data related to management of the progress status of the translation.

The screen generating unit 11 includes a function of generating the proofreading screen on which the translation 32 is to be proofread or corrected. The generated proofreading screen is sent to the proofreader terminal 50. The proofreader terminal 50 displays the proofreading screen on the display unit thereof, and the proofreader performs the proofreading or correcting work on the translation on the proofreading screen. The type of proofreading (or proofreading type) and the number of corrections for each proofread location may be input from the proofreading screen, and the proofreader may input the type of proofreading and the number of corrections for each proofread location depending on the proofread contents of the translation. Because the proofreading screen is used by the proofreader to proofread or correct the translation 32 translated by the translator, the original text and the translation 32 thereof are displayed on the proofreading screen. The translation 32 may include the new translation that is newly translated by the translator, and the translation that is extracted from the past translation results in the translation memory 20. Hence, the proofreader may efficiently perform the proofreading or correcting work by only proofreading or correcting the new translation.

The communication unit 12 sends the proofreading screen to the proofreader terminal 50. In addition, the communication unit 12 receives from the proofreading screen of the proofreader terminal 50 the proofread record 37 including the proofread or corrected translation that is proofread or corrected by the proofreader and the proofread or corrected contents of the proofread or corrected translation.

The translation fee calculating unit 13 calculates the prescribed translation fee based on the translation 32 translated by the translator and the prescribed translation fee table 34, and calculates the reduction fee based on the proofread record 37 and the reduction fee table 35. In addition, the translation fee calculating unit 13 subtracts the calculated reduction fee from the calculated prescribed translation fee, in order to calculate a payable translation fee that is to be paid to the translation company (or translator). The amount of the calculated payable translation fee may be reflected in the payment report 36.

The translation support process unit 14 includes a function of performing the translation support process. For example, this function of the translation support process unit 14 may include a function (search unit or part) to search for the past original text matching the original text (or original text file 31) that is the translation target in the translation memory 20, a function (or conversion generating unit or part) to search and acquire the past translation related to the past original text and accumulated in the translation memory 20 and to generate the reused translation by converting the original text that is the translation target into the past translation, a function (or translation screen generating unit or part) to generate the translation screen that displays the generated translation together with the original text, and a function (or translation memory update unit or part) to update the translation memory 20 by accumulating therein the generated translation as a past translation in a related manner to the original text, that is the translation target as a past original text. The details of the translation support process itself may be the same as that of the conventional translation support apparatus, including that of translation support system are proposed in Japanese Patent No. 3771159 or No. 4049299, for example.

The translator terminal 40 includes a translator storage unit (or part) 41, a translator communication unit (or part) 42, a translator input device (or part) 43, a translator display unit (or part) 44, and a translator process unit (or part) 45, whose functions may be realized by the CPU forming the translator terminal 40.

The translator storage unit 41 may be formed by a memory, a register, a hard disk or HOD, for example. The translator storage unit 41 may store control information of the browser for viewing information written in HTML (Hyper Text Markup Language). In addition, the translator storage unit 41 may store a translator terminal control program, as a plug-in of the control information of the browser. The translator terminal control program may include information transmission and reception control information to enable receiving the original text (including past original text) that is the translation target from the translation support server 10, and sending the input translation of the received original text, and translation interface control information to enable displaying a translation interface that accepts input of the new translation related to the original text from the translator.

The translator communication unit 42 enables communication between the translator terminal 40 and an external apparatus via the network 90. The translator input device 43 may be formed by a keyboard, a mouse or the like. The translator display unit 44 may be formed by a LCD (Liquid Crystal Display), a CRT (Cathode Ray Tube), a plasma display or the like. The translator input device 43 and the translator display unit 44 may be integrally formed by a touch-screen panel.

The translator process unit 45 may be formed by a CPU, and may include a plurality of computing (or operation) units configured to perform distributed processing. The translator process unit 45 executes the translator terminal control program to perform a process of acquiring the original text to be translated by the translator who operates the translator terminal 40, from the translation support server 10 via the translator communication unit 42, a process of generating the translation interface in order to receive the new translation related to the acquired original text, based on the interface control information of the translator storage unit 41, a process of displaying the acquired original text and the generated translation interface on the translator display unit 44, and a process of acquiring the new translation related to the original text, from the translator input device 43 via the translation interface. In addition, the translator process unit 45 executes the translator terminal control program to perform a process of storing the acquired new translation in the translator storage unit 41, a process of reading the new translation from the translator storage unit 41, and a process of sending the read new translation to the translation support server 10 via the translator communication unit 42. An individual ID and a password may be allocated to the translator for authentication using a known authentication technique.

The proofreader terminal 50 includes a proofreader storage unit (or part) 51, a proofreader communication unit (or part) 52, a proofreader input device (or part) 53, a proofreader display unit (or part) 54, and a proofreader process unit (or part) 55, whose functions may be realized by the CPU forming the proofreader terminal 50. For the sake of convenience, it is assumed in the following description that the proofreading includes proofreading the translation translated by the translator by referring to the original text and correcting the translation errors if any. In other words, it is assumed for the sake of convenience that the proofreader performs both the proofreading and the correcting of the translation error if any.

The proofreader storage unit 51 may be formed by a memory, a register, a hard disk or HDD, for example. The proofreader storage unit 51 may store control information of the browser for viewing information written in HTML. In addition, the proofreader storage unit 51 may store a proofreader terminal control program, as a plug-in of the control information of the browser. The proofreader terminal control program may include information transmission and reception control information to enable receiving the translation from the translation support server 10, and sending the proofread and corrected translation to the translation support server 10, and translation interface control information to enable displaying a proofreading interface that accepts input of the proofreading and correction related to the new translation from the translator. The type of proofreading and the number of corrections for each proofread location may be input from the proofreading interface (or proofreading screen), and the proofreader may input the type of proofreading and the number of corrections for each proofread location depending on the proofread contents of the translation.

The proofreader communication unit 52 enables communication between the proofreader terminal 50 and an external apparatus via the network 90. The proofreader input device 53 may be formed by a keyboard, a mouse or the like. The proofreader display unit 54 may be formed by a LCD (Liquid Crystal Display), a CRT (Cathode Ray Tube), a plasma display or the like. The proofreader input device 53 and the proofreader display unit 54 may be integrally formed by a touch-screen panel. The proofreader communication unit 52, the proofreader input device 53, and the proofreader display unit 54 may have the same structures as the translator communication unit 52, the translator input device 43, and the translator display unit 44, respectively.

The proofreader process unit 55 may be formed by a CPU, and may include a plurality of computing (or operation) units configured to perform distributed processing. The proofreader process unit 55 executes the proofreader terminal control program to perform a process of acquiring the proofreading translation that is to be proofread and has been edited by the translation support server 10, from the translation support server 10 via the proofreader communication unit 52, a process of analyzing the acquired proofreading translation and identifying the new translation included in the proofreading translation, a process of generating the proofreading interface in order to accept the proofreading of only the new translation that is identified based on the proofreading interface control information of the proofreader storage unit 51, a process of displaying the acquired proofreading translation and the generated proofreading interface on the proofreader display unit 54, and a process of acquiring the proofread new translation from the proofreader input device 53 via the proofreading interface. In addition, the proofreader process unit 55 executes the proofreader terminal control program to perform a process of storing the acquired proofread new translation in the proofreader storage unit 51 when the proofread new translation is acquired, a process of reading the proofread new translation from the proofreader storage unit 51, and a process of sending the read proofread new translation to the translation support server 10 via the proofreader communication unit 52.

(Example Operation)

Next, a description will be given of an example operation of the translation support system 100 in this embodiment, including the calculation of the translation fee performed by the translation support server 10, by referring to the proofreader screen and the payment report.

FIG. 4 is a diagram illustrating an example of the proofreading screen. In the translation support system 100, the translation support server 10 generates the proofreading screen in the proofreading stage, so that the proofreader may use the proofreader terminal 50 and proofread the translation that is translated by the translator. The proofreader may confirm the translation displayed on the proofreading screen on the proofreader terminal 50, and correct the erroneous location when the translation error or the like is found by the proofreading.

A "translation source" field 401 in a proofreading column in FIG. 4 displays a translation source, that is, the original text (in English) that is the translation target (only an excerpt illustrated for the sake of convenience). In this example, t is assumed for the sake of convenience that the translation is processed in units of sentences. A "translation source matching sentence" field 402 displays the past original text (in English) accumulated in the translation memory 20 and matching the original text. A "translation destination matching sentence" field 403 displays the past translation (in German) accumulated in the translation memory 20 and corresponding to the past text matching the original text.

A translation hit rate of 91% indicates the degree of matching between the past original text accumulated in the translation memory 20 and the original text that is the translation target. The higher the translation hit rate, the higher the reliability of the translation of the past translation displayed in the "translation destination matching sentence" field 403. If the translation hit rate is zero (0), this indicates that no matching translation exists in the translation memory 20, and nothing is displayed in the "translation source matching sentence" field 402 and the "translation destination matching sentence" field 403. If a past translation having a high translation hit rate is displayed in the "translation destination matching sentence" field 403 when the translator performs the translation, the translator may easily perform the translation by copying this past translation to a "translated sentence" field 404 and making a slight modification to this past translation if appropriate. On the other hand, if a past translation having a low translation hit rate is displayed in the "translation destination matching sentence" field 403, the translator may refer to this past translation, but it is likely that the translator will have to newly translate a large portion of the original text. The "translated sentence" field 404 displays the translation (in German) of the original text (in English) that is the translation target and is translated by the translator. The proofreader may perform the proofreading or correcting work with respect to the translation displayed in the "translated sentence" field 404.

The type of proofreading and the number of corrections for each proofread location may be input from the proofreading screen by performing the proofreading operation. FIG. 5 is a diagram illustrating an example of an input screen for the number of corrections for each type of proofreading and each proofread location. The input screen illustrated in FIG. 5 is displayed when a "proofreading type" button in a "proofreading type" field 405 of the proofreading screen illustrated in FIG. 4 is selected. The proofreader may input the number of corrections for each proofread location for each type of proofreading, as the proofreading record, depending on the proofread contents. If three translation errors (or three erroneous words) are found, for example, the number "3" is input in the blank field preceding the label "Words" in the item labeled "Translation error" on the input screen. Similarly if two spelling errors (or two misspelled words) are found, for example, the number "2" is input in the blank field preceding the label "Words" in the item labeled "Spelling error" on the input screen.

The proofreader performs operations on the proofreading screen and the input screen described above, and works on the next sentence after the proofreading of the target sentence is finished. When the proofreader finishes proofreading all sentences translated by the translator, the proofreading work may be ended by performing a predetermined operation. At the timing when this proofreading work is ended, the proofread translation and the proofread record (including the type of proofreading and the number of corrections for each proofread location) is sent from the proofreader terminal 50 to the translation support server 10.

FIG. 6 is a diagram illustrating an example of the proofread record. As illustrated in FIG. 6, the proofread record 37 records the information related to the number of corrections for each type of proofreading, for each translation hit rate. The information is segmented for each translation hit rate because the price per word is prescribed depending on the translation hit rate of the past translation that is reused.

When the translation support server 10 receives the proofread translation and the proofread record 37, the translation support system 100 advances to a billing process in which the translation fee payable to the translation company from the manufacturer is calculated. In other words, the translation support server 10 calculates the translation fee to be paid to the translation company.

The translation fee may be calculated by calculating the prescribed translation fee based on the translation 32 translated by the translator and the prescribed translation fee table 34, calculating the reduction fee based on the proofread record 37 and the reduction fee table 35, and calculating the payable translation fee to be paid to the translation company by subtracting the calculated reduction fee from the calculated prescribed translation fee.

FIG. 7 is a diagram illustrating an example of the prescribed translation fee table. The prescribed translation fee table 34 illustrated in FIG. 7 prescribes the prescribed translation fee that is calculated depending on the translation translated by the translator. The translation fee may be determined by contract between the manufacturer and the translation company. Generally, the translation fee is calculated based on the price per word, and the translation fee is calculated by multiplying the price per word by the number of translated words. Hence, it is also assumed in this example that the translation fee is determined based on the unit price per word. Accordingly, in the prescribed translation fee table 34, the translation fee is prescribed in units of words, such as € 0.16 per word. When the number of words of the translation 32 translated by the translator is acquired, the prescribed unit price per word may be multiplied by the number of words in order to calculate the prescribed translation fee. In this example, the unit price per word is set differently depending on the translation hit rate of the past translation that is reused. The higher the translation hit rate, the higher the unit price per word, because there is little translation work if the translation hit rate is high and the past translation may be reused virtually as it is. In the example illustrated in FIG. 7, only the currency € (Euros) is illustrated, but the translation fee may be prescribed in different currencies for each of the countries or, converted into the currencies of each of the countries from the currency €, that is, from one representative currency.

Next, the reduction fee that is to be reduced from the prescribed translation fee is calculated based on the proofread record 37. The reduction fee table 35 prescribes the translation fee to be reduced depending on the proofread contents of the proofreading performed by the proofreader on the translation.

FIG. 8 is a diagram illustrating an example of the reduction fee table. The reduction fee table 35 illustrated in FIG. 8 includes the type of proofreading, and the reduction rate for each type of proofreading. For example, when a "translation error" is found in the translation translated by the translator, an amount corresponding to the reduction rate "100.00%" is reduced from the prescribed translation fee. In this case, if the prescribed translation fee is € 0.16 per word, the payable translation fee is calculated as € 0.00 for the translation of the word containing the translation error. In addition, if a "syntax (or grammatical) error" is found in the translation translated by the translator, an amount corresponding to the reduction rate "75%" is reduced from the prescribed translation fee. In this case, if the prescribed translation fee is € 0.16 per word, the payable translation fee is calculated as € 0.12 for the translation of the word containing the syntax error. The reduction rate is different for each kind of translation error (or type of proofreading), because the reduction rate should be prescribed depending on the extent of the translation error. In addition, the reduction rate may urge the translator to perform the translation with care so that serious translation error is minimized.

As described above, the proofreading record 37 records the information related to the number of corrections for each type of proofreading, for each proofread location that is found and corrected by the proofreading work. Hence, the reduction fee to be reduced from the prescribed translation fee may be calculated based on the proofread record 37 and the reduction fee table 35. Because the reduction fee becomes higher as the number of translation errors increases and the more serious the translation error is, the reduction fee may be regarded as a penalty on the translator.

FIG. 9 is a diagram illustrating an example of the payment report. In the payment report illustrated in FIG. 9, a "translation hit rate" field 901 indicates the degree of matching between the past original text accumulated in the translation memory 20 and the original text that is the translation target. As illustrated in FIG. 4, the higher the translation hit rate, the higher the reliability of the translation of the past translation displayed in the "translation destination matching sentence" field 403, and the more the translator may reuse the past translation as it is. If the past translation has a high translation hit rate, the translator may easily perform the translation by essentially reusing this past translation as it is and the actual translation work of the translator is reduced. In the case where the translation hit rate is 100%, the original text that is the translation target perfectly matches the past original text, and thus, the past translation accumulated in the translation memory 20 in correspondence with the past original text may be reused as it is as the translation of the original text that is the translation target. For this reason, the translation fee is calculated depending on the unit price per word depending on the translation hit rate. The unit price per word becomes lower as the translation hit rate becomes higher, as illustrated in FIG. 7, because the higher the translation hit rate the more the past translation may be reused as it is.

In the example illustrated in FIG. 9, the number of words having the translation hit rate of "100%" is "13583" words, the number of words having the translation hit rate of "99% to 95%" is "205" words, and the number of words having the translation hit rate of "94% to 85%" is "90" words. In addition, the number of words having the translation hit rate of "84% to 75%" is "0" words, the number of words having the translation hit rate of "74% to 50%" is "0" words, and the number of words having the translation hit rate of "0% (or no match)" is "1160" words. The total number of words within the original text that is the translation target in this example is a sum of the above number words, namely, "15038" words.

The unit price based on the prescribed translation fee table 34 may be known by referring to a "unit price" field 905 illustrated in FIG. 9. If the translation hit rate is "100%", the past translation may be reused as it is as the translation of the text that is to be translated, and thus, the unit price per word is set to "€ 0.00". On the other hand, if the translation hit rate is "74% or less", the past translation may not be reused as it is as the translation of the text that is to be translated, and the unit price per word is set to "€ 0.16" because of the translation work required to translate the text.

A "number of corrected words (or number of words corrected during proofreading)" field 902 indicates the location where the reduction fee is to be calculated. In the example illustrated in FIG. 9, the type of proofreading includes "translation error", "syntax error", "spelling error", and "punctuation error", which correspond to the type of proofreading illustrated in FIG. 5. In other words, the proofread record 37 is reflected in the value in each column related to the information on the number of corrections for each proofread location for each type of proofreading, with respect to each proofread location where the error is found by the proofreading work. In addition, a "deduction (or reduction)" field indicates a value that is obtained by multiplying the number of corrections by the reduction rate for each type of proofreading in the reduction fee table 35.

When the translation fee is calculated in the example illustrated in FIG. 9, the translation error that may be the subject of the reduction from the prescribed translation fee in the "1160" words classified as having the translation hit rate of "0% (or no match)", includes "46" words having the "translation error", "2" words having the "spelling error", and "12" words having the "punctuation error". In addition, the translation error that may be the subject of the reduction from the prescribed translation fee in the "90" words classified as having the translation hit rate of "94% to 85%", includes "1" word having the "punctuation error". The reduction rate is multiplied by the number of corrections for each translation error, and the final number of words that is the subject of the translation fee calculation may be totaled in a "number of words to be paid" field 904. The unit price indicated in the "unit price" field 905 may be multiplied by each value in the "number of words to be paid" field 904 and summed in order to calculate the payable translation fee that is to be paid to the translation company. In this example, the payable translation fee, that is, the translation cost, is "€ 200.43".

(Information Processing)

Figure 10:
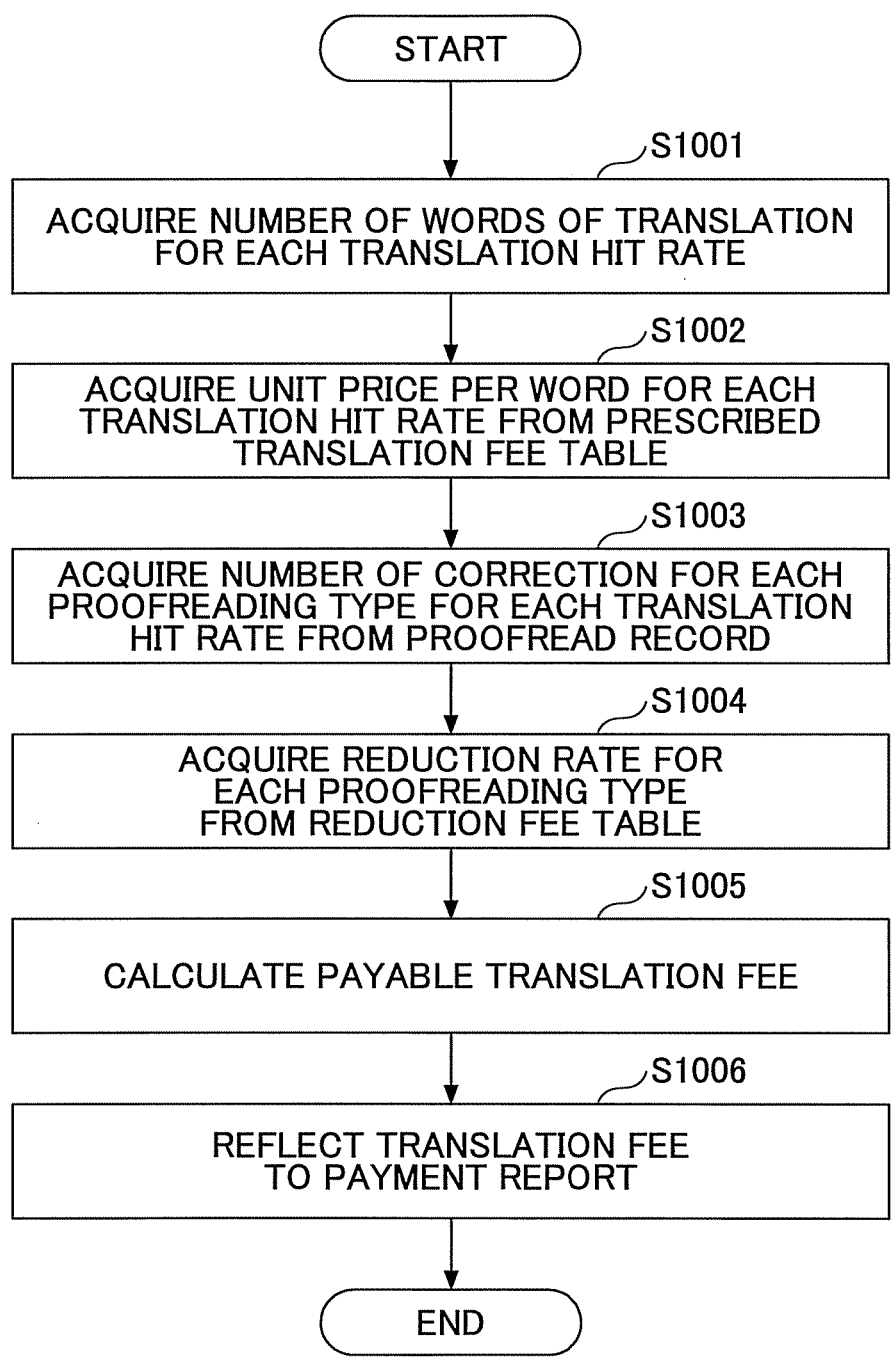
FIG. 10 is a flow chart for explaining a translation fee calculating process of the translation support server.

Next, a description will be given of the information processing performed in the translation support server 10, by referring to FIG. 10. FIG. 10 is a flow chart for explaining a translation fee calculating process of the translation support server. The translation fee calculating process illustrated in FIG. 10 may be executed at a timing when the manufacturer is to calculate the payable translation fee to be paid to the translation company, such as when outputting the payment report.

In a step S1001 illustrated in FIG. 10, the translation fee calculating unit 13 acquires the number of words of the translation translated by the translator for each translation hit rate. In a step S1002, the translation fee calculating unit 13 acquires the unit price per word for each translation hit rate, from the prescribed translation fee table 34 illustrated in FIG. 7, for example. In a step S1004, the translation fee calculating unit 13 acquires the number of corrections for each type of proofreading for each translation hit rate, from the proofreading record 37 illustrated in FIG. 6, for example. In a step S1004, the translation fee calculating unit 13 acquires the reduction rate for each type of proofreading, from the reduction fee table 35 illustrated in FIG. 8, for example.

In a step S1005, the translation fee calculating unit 13 calculates the payable translation fee to be finally paid to the translation company, by totaling the acquired information. More particularly, the number of words of the translation translated by the translator is segmented for each translation hit rate, and the unit price per word for each translation hit rate is multiplied by the segmented number of words, in order to calculate the prescribed translation fee for each translation hit rate. In addition, the number of corrections for each type of proofreading and the reduction rate for each type of proofreading are multiplied, and the reduction fee for each translation hit rate is subtracted therefrom. Furthermore, because the payable translation fee for each translation hit rate is calculated when the reduction fee for each translation hit rate is subtracted from the prescribed translation fee for each translation hit rate, the payable translation fees for each of the translation hit rates may be summed to finally calculate the payable translation fee to be finally paid to the translation company.

In the example illustrated in FIG. 9, the reduction rate is multiplied by the number of corrections for each translation error, and each product is subtracted from the number of words translated by the translator. The resulting number of words for which the translation fee is to be paid is displayed in the "number of words to be paid" field 904 illustrated in FIG. 9 for each transmission hit rate. The payable translation fee (or translation cost) to be paid to the translation company may be obtained by multiplying the unit price per word indicated in the "unit price" field 905 by each corresponding value in the "number of words to be paid" field 904. The total of the values in a "translation cost" field amounts to the payable translation fee (or total translation cost).

Because the price per unit word differs for each translation hit rate in the example illustrated in FIG. 9, the calculation must be performed by segmenting the number of words translated by the translator for each translation hit rate. However, if a constant price per unit word may be applied regardless of the translation hit rate, the number of words translated by the translator may simply be multiplied by the price per unit word in the prescribed translation fee table in order to calculate the prescribed translation fee. Further, the reduction fee may be calculated by multiplying the reduction rate for each type of proofreading by the number of corrections for each type of proofreading, and this reduction fee may be subtracted from the calculated subscribed translation fee in order to calculate the payable translation fee to be paid to the translation company.

In a step S1006, the information acquired in the steps S1001 through S1005 may be input to the payment report format, in order to reflect the information as the payment report data. As a result, the payment report illustrated in FIG. 9 may be output when the payment report data is output.

Therefore, according to the translation support apparatus (or server) in this embodiment, the number of corrections for each proofread location and for type of proofreading may be input from the proofreading screen that is displayed to enable the proofreader to proofread the translation, when calculating the translation fee to be paid to the translation company. The proofreader may input the number of corrections for each proofread location for each type of proofreading, as the proofreading record, depending on the proofread contents of the translation. The proofread record may be used to calculate the reduction fee to be reduced (or deducted) based on the reduction fee table. The payable translation fee to the paid to the translation company may be calculated by subtracting the reduction fee from the prescribed translation fee of the translation company.

Hence, if the number of translation errors is relatively large, the translation fee may be reduced in order to determine the translation fee depending on the translation quality of the translation. Instead of calculating the translation fee regardless of the number of translation errors, the translation fee may be adjusted depending on the translation quality in order to provide a sense of fairness to the client (or manufacturer in this example) regarding the translation fee. On the other hand, the translator of the translation company will be urged to improve the translation quality in order to minimize the translation error and minimize the reduction fee.

If the proofreading record is totaled for each translation company, the translation capabilities of the translation companies may be assessed therefrom. The proofreading work may be minimized if the translation company having a high translation capability is selected, to thereby improve the efficiency of the proofreading work and also improve the translation quality.

Second Embodiment

The translation memory may use a translation memory DB group including DBs related to the kind of manual (or document), the technical field, and the language. For example, the kind of the manual may include a user manual, a user FAQ (Frequently Asked Questions) manual, a service manual, a service FAQ manual, and the like. With respect to the user manual, for example, the past translation (or translation data) of the user manual translated in the past and the original text of the user manual that was the translation target may be accumulated in a user manual DB. The user manual DB may be managed for each language in the form of a German user manual DB, French user manual DB, and Italian user manual DB, for example.

The translation and the original text may be accumulated in a plurality of DBs in the above described manner, because the translation method may differ depending on the kind of manual or the language, and the plurality of DBs may improve the translation quality. More particularly, even if the same word is used in the user manual and the service manual, the word should be translated into plain language for the user who reads the user manual, while the word should be translated into professional or technical language for the service person who reads the service manual. For example, when translating the user manual from English into German, the German translation matching the English original text may be searched from the German user manual DB in order to acquire an appropriate German translation suited for the understanding by the user who reads the user manual.

More past translations may be utilized if more translation results are stored in the DB of the translation memory. In addition, the more the translation results stored in the DB of the translation memory, the higher the possibility of ncreasing the translation hit rate.

However, when the translation of the text matching the translation target is searched in the translation memory DB group, the search for the translation may be narrow if the search is limited within only one of the DBs in the translation memory DB group.

Next, a description will be given of a translation support system in a second embodiment of the present invention, which may further improve the translation hit rate using the translation memory DB group.

(System Structure and Hardware Structure)

The structure of the translation support system in the second embodiment may be the same as that illustrated in FIG. 1, and the hardware structure of the translation support server in the second embodiment may be the same as that illustrated in FIG. 2, and an illustration thereof will be omitted.

(Function)

Figure 11:
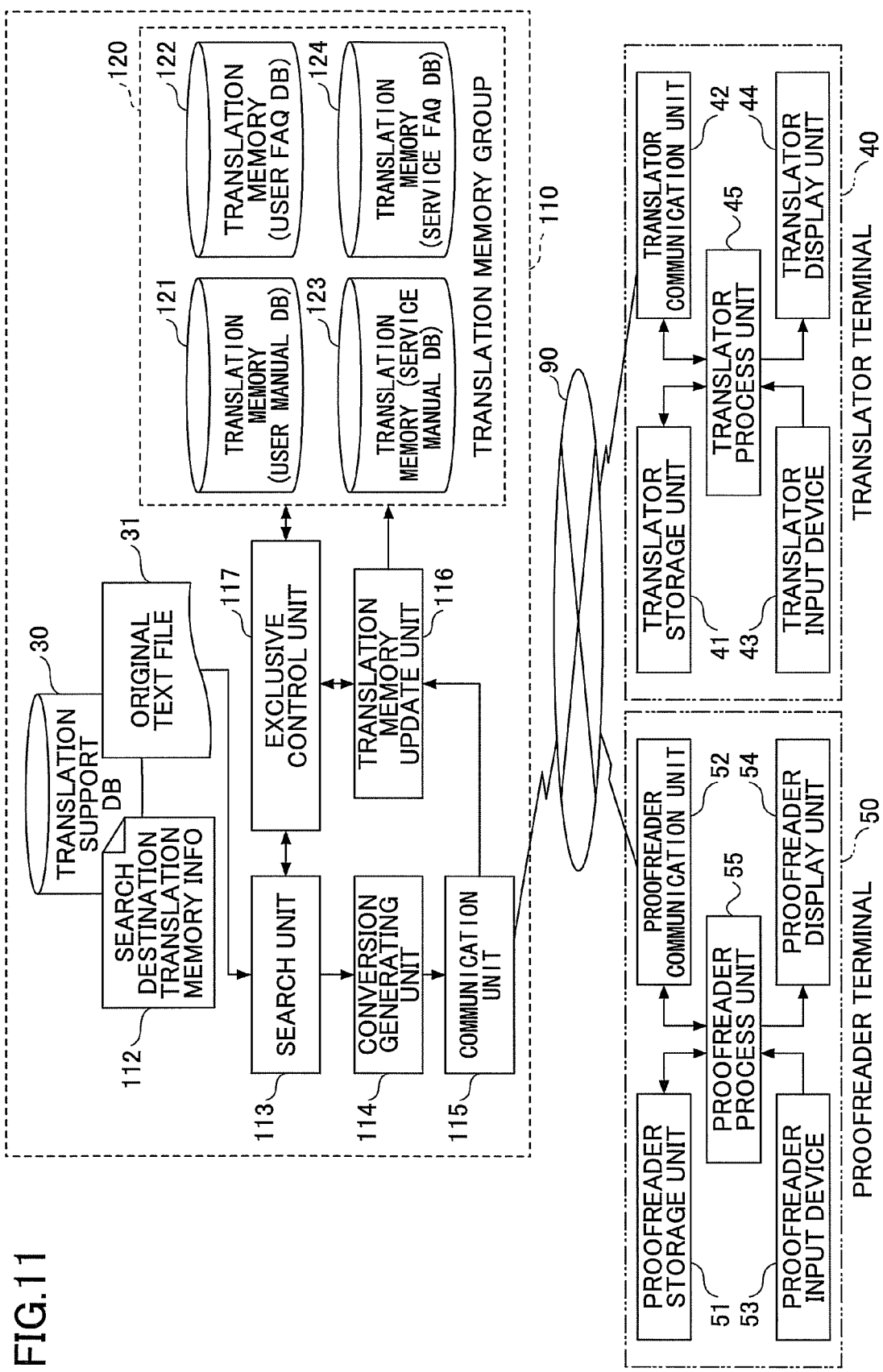
FIG. 11 is a block diagram illustrating a functional structure of an example of the translation support server and the terminals in a second embodiment of the present invention.

A description will be given of the functional structures of a translation support server 110, the translator terminal 40, and the proofreader terminal 50, by referring to FIG. 11. FIG. 11 is a block diagram illustrating the functional structure of an example of the translation support server and the terminals in the second embodiment of the present invention. In FIG. 11, those parts that are the same as those corresponding parts in FIG. 3 are designated by the same reference numerals, and a description thereof will be omitted.

The translation support server 110 includes a search unit (or part) 113, a conversion generating unit (or part) 114, a communication unit (or part) 115, a translation memory update unit (or part) 116, an exclusive control unit (or part) 117, and a translation memory group 120.

The search unit 113 includes a function of searching the past original texts matching the original text (or original text file 31) that is the translation target from the translation memory group 120. The translation memory group 120 includes a translation memory 121 including a user manual DB, a translation memory 122 including a user FAQ DB, a translation memory 123 including a service manual DB, and a translation memory 124 including a service FAQ DB, for example. As will be described later, the search unit 113 performs the search by determining one or more search destination (or search location) translation memories within the translation memory group 120 according to search destination translation memory information 112.

The conversion generating unit 114 includes a function of acquiring the past translation accumulated in the translation memory group 120 in a related manner to the past original text searched by the search unit 113, and generating the reused translation by converting the original text that is the translation target into the past translation. The reused translation is sent to the translator terminal 40, together with the original text, via the communication unit 115. The communication unit 115 includes a function of enabling communication between the translation support server 110 and external apparatuses, such as the translator terminal 40 and the proofreader terminal 50, via the network 90.

The translation memory update unit 116 includes a function of regarding the translation that is translated by the translator and sent from the translator terminal 40 or, the translation that is translated by the proofreader and sent from the proofreader terminal 50, as a past translation, and accumulating the past translation in a related manner to the original text that is the translation target and is regarded as a past original text, in the translation memory group 120 depending on the kind of manual of the original text. The translation memory group 120 includes the DBs for successively accumulating the translations (or translation data) translated by the translator in the past in a related manner to the original text that is the translation target, and the translations may be accumulated daily as the translation results. Because the translation memory group 120 is classified into the translation memories 121 through 124 depending on the kind of manual, the translations are accumulated in one of the translation memories 121 through 124 depending on the kind of manual.

The exclusive control unit 117 includes a function of prohibiting the search process of the search unit 113 during an accumulating process (or translation memory update process) in which the translation memory update unit 116 is accumulating the past translation and the corresponding past original text in the translation memory group 120. The search process of the search unit 113 is put on standby (or hold) during the accumulating process of the translation memory update unit 116, and the search process of the search unit 113 is enabled when the accumulating process ends. The accumulation of the translation results in the translation memory group 120 increases when the search process is enabled after the accumulating process ends, to thereby increase the translation hit rate of the search process. The efficiency of the translation work may be improved when the translation hit rate increases, because the amount of past translations that may be reused increases.

The search destination translation memory information 112 may be formed by a translation memory meta search list, for example. The search destination translation memory information 112 may prescribe two or more translation memories of the translation memory group 120, that are to be the search destinations, depending on the kind of manual of the original text that is the translation target. For example, if the kind of manual of the original text that is the translation target is "user manual", the search destination translation memory information 112 prescribes the translation memory 121 including the user manual DB and the translation memory 122 including the user FAQ DB as the search destinations to be searched. Because the search unit 113 determines the search destination translation memories within the translation memory group 120 according to search destination translation memory information 112 when performing the search process, the search unit 113 determines the translation memory 121 including the user manual DB and the translation memory 122 including the user FAQ DB as the search destination translation memories if the kind of manual of the original text that is the translation target is the "user manual".

The translation memories 121 through 124 including the respective DBs may have physically separate structures or logically separate structures. For example, the translation memory 121 including the user manual DB may store the original texts and their translations of the user manual (for the user), and the translation memory 122 including the user FAQ DB may store the original texts and their translations of the FAQ manual for the user. In addition, the translation memory 123 including the service manual DB may store the original texts and their translations of the service manual (for the service person), and the translation memory 124 including the service FAQ DB may store the original texts and their translations of the FAQ manual for the service person. The DBs of each of the translation memories 121 through 124 may further be segmented for each language. Further, the number of translation memories forming the translation memory group 120 is of course not limited to four as in the example illustrated in FIG. 11.

Of course, it is possible to use for the translation memory group 120 an existing translation memory group without having to modify the structure thereof if the existing translation memory group is formed by translation memories including respective DBs having physically separate structures or logically separate structures.

Figure 12:
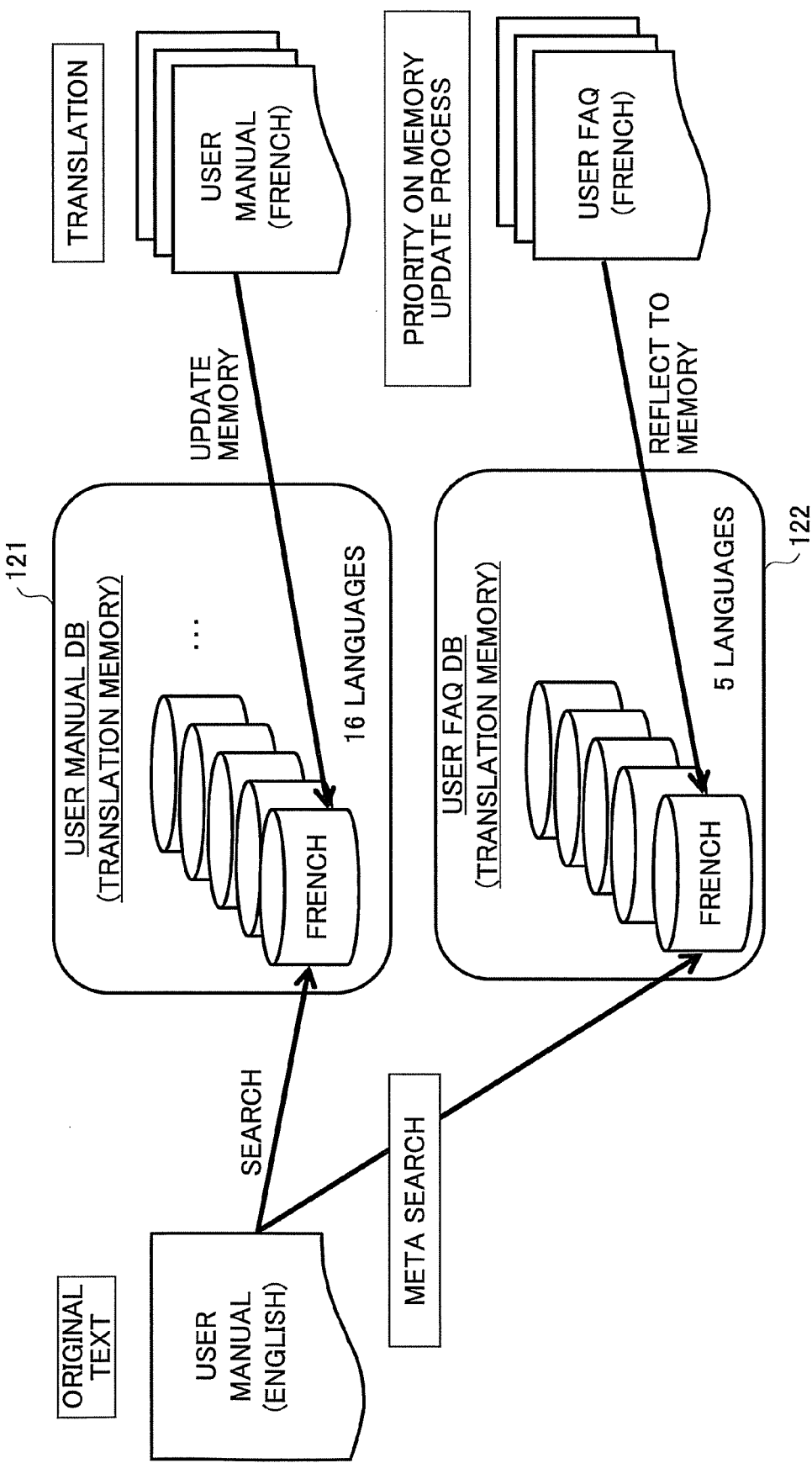
FIG. 12 is a diagram generally illustrating an information processing of the translation support server.

Next, a description will be given of the information processing performed by the translation support server 110, by referring to FIG. 12. FIG. 12 is a diagram generally illustrating the information processing of the translation support server. FIG. 12 illustrates an example in which the translation memory 121 includes the user manual DB in 16 languages, and the translation memory 122 includes the user FAQ DB in 5 languages. The translation support server 110 performs the information processing to search a suitable translation from as much translation results as possible, in order to improve the translation hit rate of the translation and to increase the possibility of finding the translation that may be reused.

First, the translation support server 110 performs a meta search with respect to the translation memory group 120 that is classified into the translation memories 121 through 124 for each kind of manual, in order to find a suitable translation from as much translation results as possible and to improve the translation hit rate of the translation. When performing a matching (or search) of the original text that is to be translated with respect to the translation results accumulated in the translation memory group 120 to find a corresponding past translation, the translation support server 110 basically searches the translation memory of the kind of manual corresponding to that of the original text. For example, if the original text is the user manual, the past translation is searched in the translation memory 121 including the user manual DB, but in addition, the past translation is searched in the translation memory 122 including the user FAQ DB. Because the user FAQ and the user manual are both used by the user, the user FAQ may include translations of the same words or similar words as those used in the user manual, and the user FAQ may be created using the user manual. Accordingly, when the original text is the user manual, it may be possible to improve the translation hit rate of the translation being searched by not only searching the translation memory 121 including the user manual DB but also the translation memory 122 including the user FAQ DAB. In this specification, the search performed with respect to a plurality of translation memories within the translation memory group 120 will be referred to as the "meta search".

Second, the translation support server 110 performs the exclusive control during the translation memory update, in order to search the suitable translation from as much translation results as possible, in order to improve the translation hit rate. The translation memory group 120 includes the DBs for successively accumulating the translations (or translation data) translated by the translator in the past in a related manner to the original text that is the translation target, and the translations may be accumulated daily as the translation results. Hence, the search process (or search job) and the translation memory update process (or update job) may be generated simultaneously with respect to the translation memory group 120. For this reason, the exclusive control unit 117 prohibits the search process during the translation memory update process and puts the search process on standby during the translation memory update process, and the search process is enabled when the translation memory update process ends. The amount of translation results in the translation memory group 120 increases when the search process is enabled after the translation memory update process ends, to thereby increase the translation hit rate of the search process.

(Search Destination Translation Memory Information)

The translation support server 110 includes the search destination translation memory information 112 in order to realize the meta search described above.

FIG. 13 is a diagram illustrating an example of the search destination translation memory information. As described above, the search destination translation memory information 112 prescribes two or more translation memories of the translation memory group 120 that are the search destinations, depending on the kind of manual of the original text that is the translation target. The translation memories 121 through 124 of the translation memory group 120 at the search destinations are prescribed to correspond to the kind of manual of the original text that is the translation target. The search unit 113 refers to the search destination translation memory information 112 when performing the meta search. Hence, the search unit 113 determines the search destination translation memories within the translation memory group 120 based on the kind of manual of the original text that is the translation target, and the search process is performed with respect to the translation memories that are determined.

FIG. 13 illustrates the kind (or field) of manual of the original text and the corresponding search destination translation memories. For example, if the kind of user manual is "UM (User Manual)", the corresponding search destination translation memories or manual DBs are "UM" and "U-FAQ (User FAQ manual)". In this case, the search unit 113 searches the translation memories 121 and 122 respectively including the user manual DB and the user FAQ DB. In FIG. 13 and FIG. 14 which will be described later, "SM" denotes service manual, and "S-FAQ" denotes service FAQ manual.

The contents of the search destination translation memory information 112 may be prescribed beforehand by the system manager or the like. The characteristics among the translation memories 121 through 124 within the translation memory group 120 may be take into consideration when prescribing the search destination translation memories. Generally, when translating the manual, the translation should preferably include words (or terms) and expressions that are easily understood by people who read the translation of the manual. In other words, the words and expressions that are used in the translation of the manual may differ depending on the kind of manual. This is the reason why the conventional translation memory is formed for each kind or field of the manual, and the search destination translation memory conventionally differs depending on the kind of the manual to which the original text to be translated belongs.

However, the translation memories 121 and 122, for example, respectively accumulate the translations for the user manual and the user FAQ manual that are created based on the assumption that these manuals will be read by the same people (or same type of user), namely, the user. In addition, the same word or expression is likely to be translated into the same translation for both the user manual and the user FAQ manual. On the other hand, the translation memories 123 and 124, for example, respectively accumulate the translations for the service manual and the service FAQ manual that are created based on the assumption that these manuals will be read by the same people, namely, the service person. The same word or expression is likely to be translated into the same translation for both the service manual and the service FAQ manual, but the translation may be different from that for the user manual and the user FAQ manual, because the service person understands more professional or technical language compared to the user. Accordingly, when the system manager prescribes the contents of the search destination translation memory information in this embodiment, the system manager may take into account the people who will be reading the manuals. As a result, the search unit 113 may determine from the translation memories 121 through 124 within the translation memory group 120 the search destination translation memories that include the manual DBs intended for the same people (for example, the user) and may contribute to improved translation efficiency, and find the translation with respect to the original text that is the translation target by performing the meta search with respect to the search destination translation memories that are determined.

Returning now to the description of FIG. 13, when prescribing the contents of the search destination translation memory information beforehand, the system manager may, as a rule, prescribe the translation memory corresponding to the kind of manual to which the original text to be translated belongs. In addition, the system manager may additionally prescribe the translation memory including the manual DB of the manual that will be read by the same people as the kind of manual to which the original text to be translated belongs. In other words, if the kind of manual of the original text to be translated is "UM" the translation memory 121 including the "UM" DB is prescribed as the search destination translation memory, and further, the translation memory 122 including the "U-FAQ" DB may be additionally prescribed as the search destination translation memory. Of course, if the translation memory group 120 includes other translation memories including the manual DBs of the kind of manual that will be read by the same people as the user manual ("UM"), such translation memories may further be prescribed as the search destination translation memories.

(Management Table of Translation Memory Use Status)

The translation support server 110 performs the translation memory update process by managing a management table for managing the translation memory use status (hereinafter referred to as a use status management table) in a memory space within the RAM 103, for example.

FIG. 14 is a diagram illustrating an example of the use status management table. The use status management table manages the use status of the translation memory group 120 for each of the translation memories 121 through 124 including the respective manual DBs. In FIG. 14, "UM", "U-FAQ", "SM", and "S-FAQ" respectively denote the manual DBs of the translation memories 121 through 124. Each translation memory includes the manual DBs in 4 languages, namely, German, French, Italian, and Spanish. Hence, the use status of a total of 16 manual DBs may be managed by the use status management table. The use status of the manual DB includes "R (Read)" and "W (Write)". The translation is read from the manual DB when the use status "R" is "1", and the read ends when the use status "R" becomes "0". The translation is written into the manual DB when the use status "W" is "1", and the write ends when the use status "W" becomes "0".

The translation memory group 120 includes the translation memories 121 through 124 or the manual DBs for successively accumulating the translations (or translation data) translated by the translator in the past in a related manner to the original text that is the translation target, and the translations may be accumulated daily as the translation results. Hence, the use status "W" of the use status management table is "1" when the translation memory update unit 116 accumulates (or updates) the translation in the corresponding translation memory, and the use status "W" becomes "0" when the accumulation (or updating) ends.

The search process (or search job) and the translation memory update process (or update job) may be generated simultaneously. In this case, the exclusive control unit 117 of the translation support server 110, which manages the use status of the translation memories 121 through 124 by the use status management table, may prohibit the search process during the translation memory update process and put the search process in standby. The exclusive control unit 117 may enable the search process, which is in standby, after the translation memory update process ends. By this exclusive control performed by the exclusive control unit 117, the amount of the translation results is increased as much as possible, in order to improve the translation hit rate of the translation that is searched.

(Meta Search)

Figure 15:
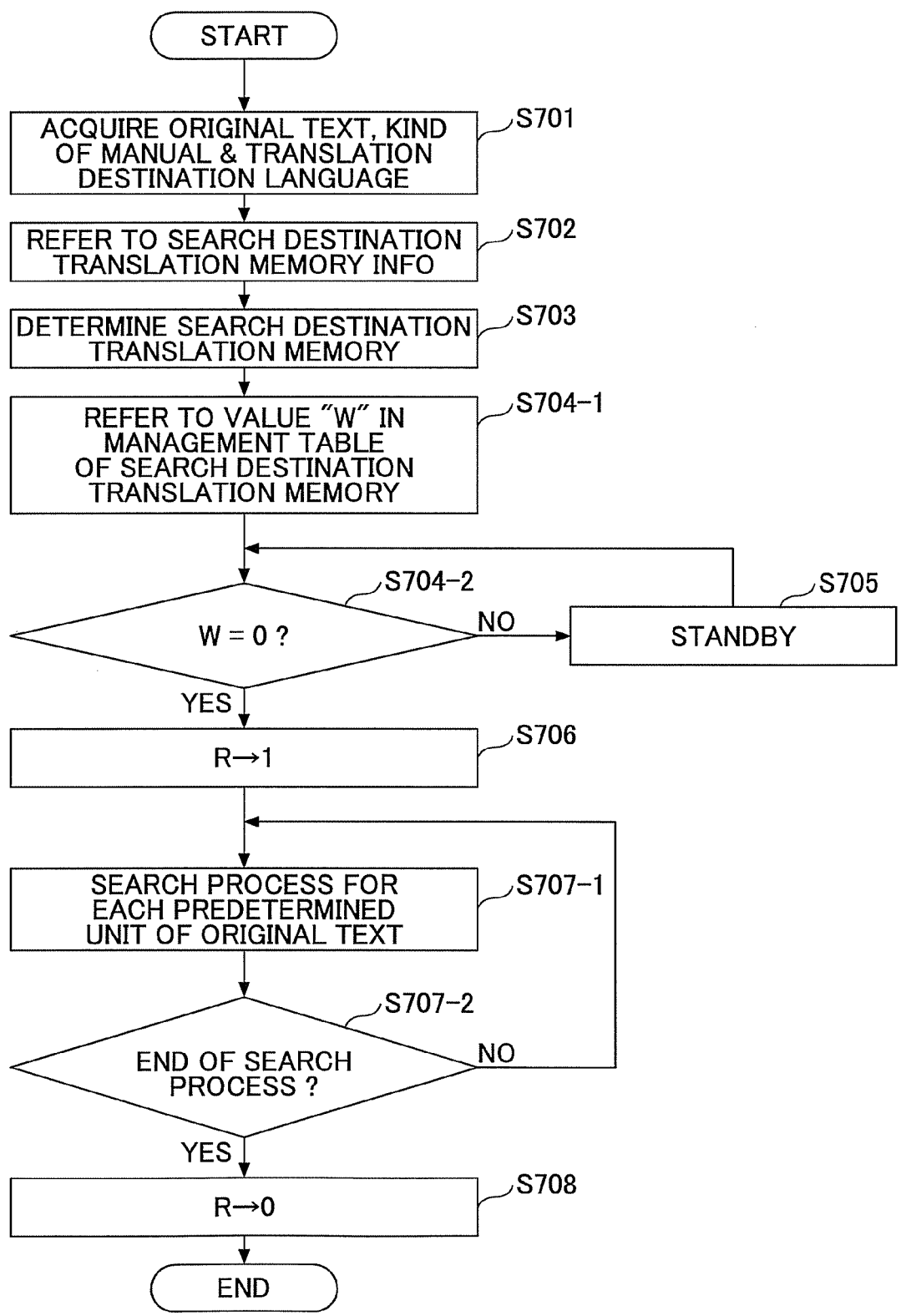
FIG. 15 is a flow chart for explaining a meta search process of the translation support server.

FIG. 15 is a flow chart for explaining the meta search process of the translation support server. The meta search process illustrated in FIG. 15 may be started after the manager at the manufacturer, for example, inputs the original text file 31 that is the translation target and specifies the kind (or field) of the manual in the original language and the language to which the translation is to be made, from the manager terminal 60. The meta search process searches for translation of the original text, and may find the matching or approximately matching past translation. The past translation that may be reused and the passage that needs to be newly translated by the translator may be sent to the translator terminal 40.

In a step S701 illustrated in FIG. 15, the search unit 113 acquires the original text that is the translation target, the kind of the manual to which the original text belongs, and the translation destination language to which the translation is to be made. For example, it is assumed for the sake of convenience that the original text that is the translation target is in "English", the kind of the manual is the "UM", and the translation destination language is "German". The information acquired in the step S701 may be provided by the manager at the manufacturer, and may be saved in a file format, such as a JOB file, within the translation support server 110.

In a step S702, the search unit 113 refers to the translation destination translation memory information 112. In a step S703, the search unit 113 determines the search destination translation memories. Because the kind of manual of the original text is "UM" in this example, the search destination translation memories are determined to be "UM" DB in German and "U-FAQ" DB in German, as may be seen from FIG. 13.

In this case, the search unit 113 performs the search process with respect to the translation memories 121 and 122 including the "UM" and "U-FAQ" DBs and the exclusive control unit 117 performs the exclusive control with respect to the search process. In a step S704-1, the exclusive control unit 117 refers to the values of "W" for the "UM" and "U-FAQ" DBs in the use status management table when performing the exclusive control. Further, in a step S704-2, the exclusive control unit 117 decides whether the values of "W" for the "UM" and "U-FAQ" DBs is "0" in the use status management table. If the decision result in the step S704-2 is NO, the exclusive control unit 117 prohibits the search process and the search process is put on standby for a predetermined time in a step S705, and the process returns to the step S704-2. In other words, the search process is put on standby until the values of "W" for the "UM" and "U-FAQ" DBs becomes "0" in the use status management table.

More particularly, the search unit 113 performs the search process with respect to the "UM" and "U-FAQ" DBs, and because the values of "W" are all "0" for the "UM" and "U-FAQ" DBs in German in the use status management table illustrated in FIG. 14, no translation memory update process is in progress for the "UM" and "U-FAQ" DBs in German. Hence, the exclusive control unit 117 enables the search process of the search unit 113.

On the other hand, if the value of "W" is "1" for at least one of the "UM" and "U-FAQ" DBs in German in the use status management table illustrated in FIG. 14, the translation memory update process is in progress for the "UM" or "U-FAQ" DB in German of the corresponding translation memories. Hence, the search process is once prohibited for the predetermined time and the search process is put on standby. If the value of "W" becomes "0" for the "UM" and "U-FAQ" DBs in German in the use status management table after the predetermined time, the search process is enabled. In other words, the search process is enabled after waiting for the translation memory update process to end, in order to increase the amount of translations accumulated in the translation memory group 120 and to improve the translation hit rate.

If the decision result in the step S704-2 is YES, the search unit 113 sets the value of "R" to "1" in the use status management table for the translation memories in which the search process is to be performed, in a step S706, in order to indicate the read that is being performed from the corresponding manual DB.

In a step S707-1, the search unit 113 performs the search process in predetermined units of the original text that is the translation target. The predetermined unit may be a word, a sentence, a paragraph, or the like. If the translation memory group 120 includes a plurality of translation memories, such as the translation memories 121 through 124 of this example, the meta search is performed with respect to the plurality of translation memories of the translation memory group 120. In this example, the meta search is performed with respect to the "UM" and "U-FAQ" DBs in German, in order to find the German translation for the original text in English. In a step S707-2, the search unit 113 decides whether the search process (or meta search) ended. The process returns to the step S707-1 if the decision result in the step S707-2 is NO.

If the decision result in the step S707-2 is YES, the process advances to a step S708. In the step S708, the search unit 113 sets the value of "R" to "0" in the use status management table for the translation memories in which the search process was performed, and the process ends.

When the search process ends, the past original text matching the original text that is the translation target is found from the searched translation memories, that is, the "UM" and "U-FAQ" DBs in German, and the past translation accumulated in relation to the matching past original text is retrieved to perform the conversion, that is, achieve an automatic translation. In other words, the conversion generating unit 114 acquires the past translation searched by the search unit 113, and generates the reused translation by converting the original text that is the translation target into the past translation. After this automatic translation (or conversion), the translated original text may include the past translation and a portion that needs to be newly translated. The translated original text, including the past translation and the portion that needs to be newly translated, is sent to the translator terminal 40 via the Web browser, for example, so that the translator may translate the portion that needs to be newly translated.

Because the translation support server 110 in this embodiment refers to the search destination translation memory information and performs the meta search throughout the plurality of translation memories within the translation memory group 120, it is possible search the translation from a large amount of translation results (or translation memories) when compared to the case where only a single translation memory is searched. The meta search is limited to those translation memories that are mutually related and include the manual DBs storing the kinds of manuals to be read by the same people, for example. That is, the meta search is limited to those translation memories that are likely to improve the translation hit rate. As a result, the translation hit rate may be improved, and the likelihood of finding an appropriate translation increases.

(Translation Memory Update Process)

Figure 16:
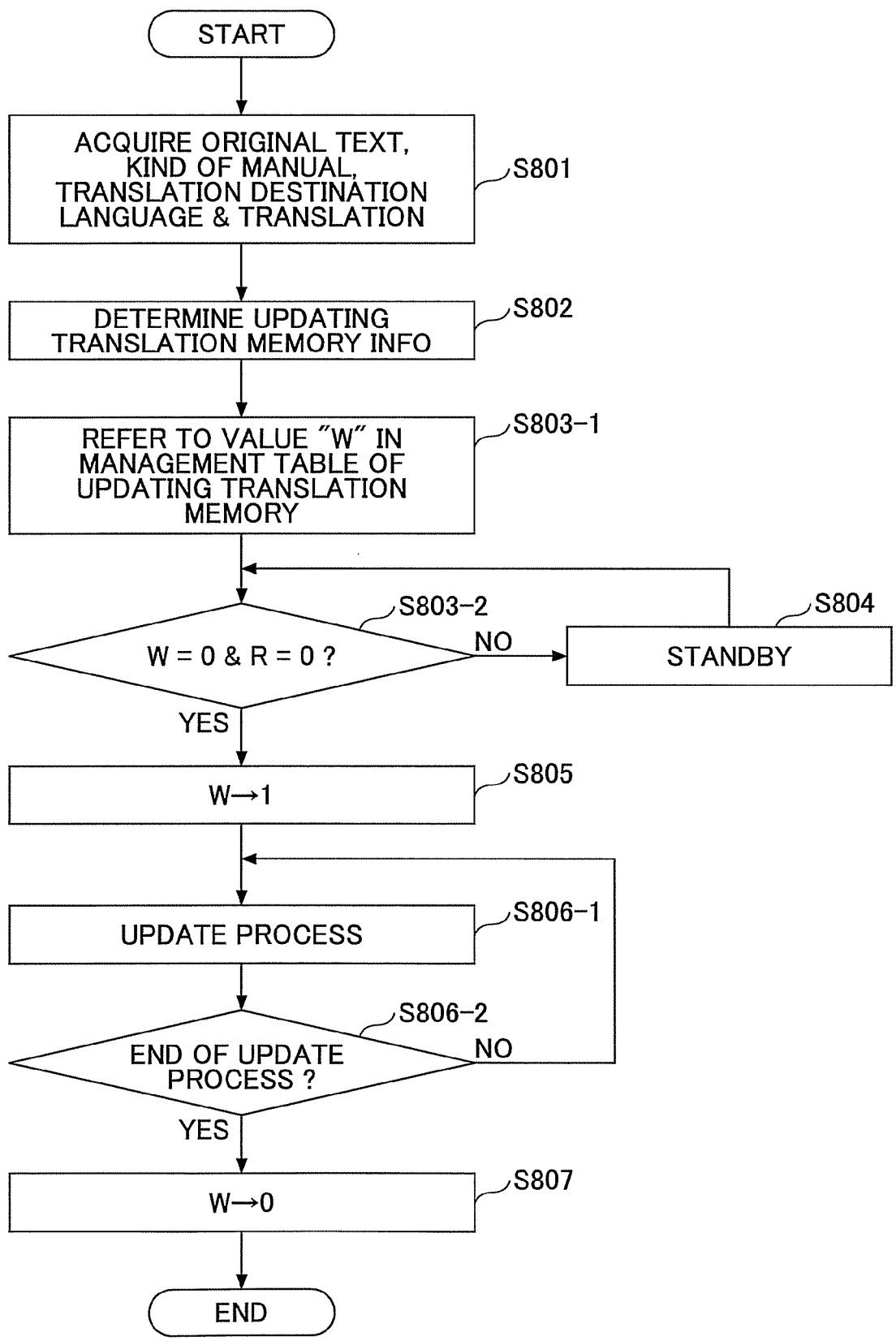
FIG. 16 is a flow chart for explaining a translation memory update process of the translation support server.

FIG. 16 is a flow chart for explaining a translation memory update process of the translation support server. The translation memory update process illustrated in FIG. 16 may be started when the translation translated by the translator is sent from the translator terminal 40 to the translation support server 110 via the network 90. The translation memory update process relates the translation (or translation data) and the corresponding original text from which the translation was made, and reflects the related translation and corresponding original text in the translation memory by accumulating or updating the translation memory.

In a step S801 illustrated in FIG. 16, the translation memory update unit 116 acquires the original text that is the translation target, the kind of the manual to which the original text belongs, the translation destination language, and the translated translation. The original text that is the translation target, the kind of the manual to which the original text belongs, and the translation destination language may be managed within the translation support DB 30 of the translation support server 110. In addition, the translated translation may be received from the translator terminal 40 via the network 90 and the communication unit 115. For example, it is assumed for the sake of convenience that the original text that is the translation target is in "English", the kind of the manual is the "UM", and the translation destination language is "German".

In a step S802, the translation memory update unit 116 determines the update destination translation memory. Because the kind of manual of the original text is "UM" in this example and the translation is to be made into German, the update destination translation memory is determined to be "UM" DB in German.

In a step S803-1, the exclusive control unit 117 (or the translation memory update unit 116) refers to the values of "W" and "R" for the "UM" DB in the use status management table. Further, in a step S803-2, the exclusive control unit 117 (or the translation memory update unit 116) decides whether the values of "W" and "R" for the "UM" DB are both "0" in the use status management table. If the decision result in the step S803-2 is NO, the exclusive control unit 117 (or translation memory update unit 116) prohibits the translation memory update process and the translation memory update process is put on standby for a predetermined time in a step S804, and the process returns to the step S803-2. In other words, the translation memory update process is put on standby until the values of "W" and "R" for the "UM" DB become "0" in the use status management table, because the write or read is being performed with respect to the "UM" DB if the value of "W" or "R" is "1".

On the other hand, if the decision result in the step S803-2 is YES, the translation memory update unit 116 sets the value of "W" to "1" in the use status management table for the translation memory in which the translation memory update process is to be performed, in a step S805, in order to indicate the write that is being performed to the corresponding manual DB. In a step S806-1, the translation memory update unit 116 starts the translation memory update process, in order to relate the translation (or translated data) in German to the original text in English and to accumulate the related translation and original text in the corresponding translation memory (121 in this example).

In a step S806-2, the translation memory update unit 116 decides whether the translation memory update process ended. The process returns to the step S806-1 if the decision result in the step S806-2 is NO. If the decision result in the step S806-2 is YES, the translation memory update unit 116 sets the value of "W" to "0" in the use status management table for the translation memory in which the translation memory update process was performed, in a step S807, in order to indicate the write is not being performed to the corresponding manual DB, and the process ends.

Accordingly, in the translation support server 110, exclusive control is performed with respect to the translation memory update process, so that the translation memory update process with respect to the translation memory is prohibited during the read or write with respect to this translation memory.

The processes of the translation support apparatus described above in conjunction with the described embodiments may be performed by executing, by a computer (for example, CPU), a program that is stored in a suitable computer-readable storage medium, such as a non-transitory storage medium and a tangible storage medium.

Of course, the translation support system of the first embodiment and the translation support system of the second embodiment may be combined into a single translation support system that includes the functions of both the first and second embodiments.

Further, the present invention is not limited to these embodiments, but various variations and modifications may be made without departing from the scope of the present invention.

What is claimed is:

1. A translation support apparatus connectable to a translator terminal and a proofreader terminal via a network, and configured to manage a series of processes related to a translation work of an original text that is a translation target into a translation in a predetermined language and a proofreading work of the translation, said translation support apparatus comprising:
    a memory configured to:
    store translations from the translator terminal, a prescribed translation fee table of prescribed translation fees calculated depending on the translations, and a reduction fee table of reduction fees to be deducted depending on proofread contents of the translation;
    a processor configured to:
    generate a proofreading screen including the translation to be proofread;
    send the proofreading screen to the proofreader terminal, and to receive a proofread translation and a proofread record recorded with the proofread contents of a proofread translation from the proofreader terminal via the proofreading screen; and
    calculate a payable translation fee by subtracting a reduction fee calculated based on the proofread record and the reduction fee table from a prescribed translation fee calculated based on the translation from the translation terminal and the prescribed translation fee table.

2. The translation support apparatus as claimed in claim 1, wherein the proofreading screen includes an input screen to receive input of a type of proofreading and a number of corrections for each proofread location, the proofread record includes the type of proofreading and the number of corrections for each proofread location, the reduction fee table prescribes a translation fee to be deducted for each type of proofreading, and the processor calculates the reduction fee by multiplying the number of corrections by the translation fee to be deducted for each type of proofreading.

3. A non-transitory computer-readable storage medium which stores a program which, when executed by a computer that is connectable to a translator terminal and a proofreader terminal via a network, causes the computer to perform a process related to a translation work of an original text that is a translation target into a translation in a predetermined language and a proofreading work of the translation, said process comprising:

a storage procedure causing the computer to store, in a storage unit, translations from the translator terminal, a prescribed translation fee table of prescribed translation fees calculated depending on the translations, and a reduction fee table of reduction fees to be deducted depending on proofread contents of the translation;

a screen generating procedure causing the computer to generate a proofreading screen including the translation to be proofread;

a communication procedure causing the computer to send the proofreading screen to the proofreader terminal, and to receive a proofread translation and a proofread record recorded with the proofread contents of a proofread translation from the proofreader terminal via the proofreading screen; and a calculating procedure causing the computer to calculate a payable translation fee by subtracting a reduction fee calculated based on the proofread record and the reduction fee table from a prescribed translation fee calculated based on the translation from the translation terminal and the prescribed translation fee table.

4. The non-transitory computer-readable storage medium as claimed in claim 3, wherein the proofreading screen includes an input screen to receive input of a type of proofreading and a number of corrections for each proofread location, the proofread record includes the type of proofreading and the number of corrections for each proofread location, the reduction fee table prescribes a translation fee to be deducted for each type of proofreading, and the calculating procedure causes the computer to calculate the reduction fee by multiplying the number of corrections by the translation fee to be deducted for each type of proofreading.

\* \* \* \* \*